US009473778B2

(12) United States Patent
Chou et al.

(10) Patent No.: US 9,473,778 B2
(45) Date of Patent: Oct. 18, 2016

(54) SKIP THRESHOLDING IN PIPELINED VIDEO ENCODERS

(71) Applicant: Apple Inc., Cupertino, CA (US)

(72) Inventors: Jim C. Chou, San Jose, CA (US); Craig M. Okruhlica, San Jose, CA (US); Guy Cote, San Jose, CA (US)

(73) Assignee: Apple Inc., Cupertino, CA (US)

( * ) Notice: Subject to any disclaimer, the term of this patent is extended or adjusted under 35 U.S.C. 154(b) by 384 days.

(21) Appl. No.: 14/039,871

(22) Filed: Sep. 27, 2013

(65) Prior Publication Data

US 2015/0092855 A1    Apr. 2, 2015

(51) Int. Cl.
| | |
|---|---|
| H04N 7/26 | (2006.01) |
| H04N 19/17 | (2014.01) |
| H04N 19/105 | (2014.01) |
| H04N 19/147 | (2014.01) |
| H04N 19/192 | (2014.01) |
| H04N 19/176 | (2014.01) |
| H04N 19/186 | (2014.01) |

(52) U.S. Cl.
CPC ............ *H04N 19/17* (2014.11); *H04N 19/105* (2014.11); *H04N 19/147* (2014.11); *H04N 19/192* (2014.11); *H04N 19/176* (2014.11); *H04N 19/186* (2014.11)

(58) Field of Classification Search
CPC .................. H04N 19/00278; H04N 19/00527; H04N 19/105; H04N 19/147; H04N 19/17; H04N 19/176; H04N 19/186; H04N 19/192
See application file for complete search history.

(56) References Cited

U.S. PATENT DOCUMENTS

| | | | |
|---|---|---|---|
| 7,606,311 B2 | 10/2009 | Hsu et al. | |
| 8,189,668 B2 | 5/2012 | Hong et al. | |
| 2004/0240556 A1* | 12/2004 | Winger | H04N 19/176 375/240.18 |
| 2006/0204113 A1* | 9/2006 | Wang | H04N 19/147 382/236 |
| 2008/0117974 A1* | 5/2008 | Ramachandran | H04N 19/176 375/240.16 |
| 2009/0003451 A1 | 1/2009 | Lin et al. | |
| 2013/0136179 A1 | 5/2013 | Lim et al. | |

OTHER PUBLICATIONS

ITU-T H2.64 "Series H: Audiovisual and Multimedia Systems Infrastructure of Audiovisual Services—Coding of Moving Video—Advanced video coding for generic audiovisual services" Apr. 2013 pp. 1-732.
Y Zhao and I E G Richardson "Macroblock Skip-Mode Prediction for Complexity Control of Video Encoders" International Conference on Visual Information Engineering (VIE 2003). Ideas, Applications, Experience, Jan. 2003 pp. 5-8.

* cited by examiner

*Primary Examiner* — Andy Rao
*Assistant Examiner* — Tyler Edwards
(74) *Attorney, Agent, or Firm* — Robert C. Kowert; Meyertons, Hood, Kivlin, Kowert & Goetzel, P.C.

(57) ABSTRACT

The video encoders described herein may make an initial determination to designate a macroblock as a skip macroblock, but may subsequently reverse that decision based on additional information. For example, an initial skip mode decision may be based on aggregate distortion metrics for the luma component of the macroblock (e.g., SAD, SATD, or SSD), then reversed based on an individual pixel difference metric, an aggregate or individual pixel metric for a chroma component of the macroblock, or on the position of the macroblock within a macroblock row. The final skip mode decision may be based, at least in part, on the maximum difference between any pixel in the macroblock (or in a region of interest within the macroblock) and the corresponding pixel in a reference frame. The initial skip mode decision may be made during an early stage of a pipelined video encoding process and reversed in a later stage.

20 Claims, 18 Drawing Sheets

FIG. 10

SKIP THRESHOLDING IN PIPELINED VIDEO ENCODERS

BACKGROUND

1. Technical Field

This disclosure relates generally to video or image processing, and more specifically to methods and apparatus for processing digital video frames in block processing pipelines.

2. Description of the Related Art

Various devices including but not limited to personal computer systems, desktop computer systems, laptop and notebook computers, tablet or pad devices, digital cameras, digital video recorders, and mobile phones or smart phones may include software and/or hardware that may implement a video processing method. For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources and output the processed video frames according to one or more video processing methods. As an example, a video encoder 110 as shown in FIG. 1 represents an apparatus, or alternatively a software program, in which digital video input (input frames 120) is encoded or converted into another format (output frames 130), for example a compressed video format such as H.264/Advanced Video Coding (AVC) format (also referred to as MPEG 4 Part 10), according to a video encoding method. An apparatus or software program such as a video encoder 110 may include multiple functional components or units, as well as external interfaces to, for example, video input sources and external memory.

In some video processing methods, to perform the processing, each input video frame 120 is divided into rows and columns of blocks of pixels (e.g., 16×16 pixel blocks), for example as illustrated in FIG. 2 which shows an example 192×192 pixel frame 120 divided into 144 16×16 pixel blocks (illustrated in FIG. 2 as blocks 220). Each block of an input video frame 120 is processed separately, and when done the processed blocks are combined to form the output video frame 130. This may be referred to as a block processing method. Conventionally, the blocks are processed by the block processing method in scan order as shown in FIG. 2, beginning at the first block of the first row of the frame (shown as block 0), sequentially processing the blocks across the row, and continuing at the first block of the next row when a row is complete.

A block processing method may include multiple processing steps or operations that are applied sequentially to each block in a video frame. To implement such a block processing method, an apparatus or software program such as a video encoder 110 may include or implement a block processing pipeline 140. A block processing pipeline 140 may include two or more stages, with each stage implementing one or more of the steps or operations of the block processing method. FIG. 1 shows an example video encoder 110 that implements an example block processing pipeline 140 that includes at least stages 142A through 142C. A block is input to a stage 142A of the pipeline 140, processed according to the operation(s) implemented by the stage 142A, and results are output to the next stage 142B (or as final output by the last stage 142). The next stage 142B processes the block, while a next block is input to the previous stage 142A for processing. Thus, blocks move down the pipeline from stage to stage, with each stage processing one block at a time and multiple stages concurrently processing different blocks. Conventionally, the blocks are input to and processed by the block processing pipeline 140 in scan order as shown in FIG. 2. For example, in FIG. 1, the first block of the first row of the frame shown in FIG. 2 (block 0) is at stage 142C, the second block (block 1) is at stage 142B, and the third block (block 2) is at stage 142A. The next block to be input to the block processing pipeline 140 will be the fourth block in the first row.

H.264/Advanced Video Coding (AVC)

H.264/AVC (formally referred to as ITU-T Recommendation H.264, and also referred to as MPEG-4 Part 10) is a block-oriented motion-compensation-based codec standard developed by the ITU-T (International Telecommunications Union—Telecommunication Standardization Sector) Video Coding Experts Group (VCEG) together with the ISO/IEC JTC1 Moving Picture Experts Group (MPEG). The H.264/AVC standard is published by ITU-T in a document titled "ITU-T Recommendation H.264: Advanced video coding for generic audiovisual services". This document may also be referred to as the H.264 Recommendation.

Video Encoding Artifacts

Video encoders typically take each input video frame, divide it into blocks and determine the best mode in which to code each block. In some video encoders, each block is compared to a best predictor block within a reference frame to determine if it can be coded in a skip mode (e.g., in a mode in which the block is represented directly by the best predictor block). For example, some video encoders compute the sum of absolute differences (SAD) between each input block and the best predictor block (an L1 norm), or the sum of the differences squared (SSD) between the input block and the best predictor block (an L2 norm), and if the sum is below a pre-determined skip threshold value, the block is coded in a skip mode. In some cases, this approach can lead to ghosting artifacts or trailing artifacts, or can cause chroma artifacts in flat color regions.

SUMMARY OF EMBODIMENTS

Embodiments of block processing methods and apparatus are described in which a block processing pipeline includes multiple pipeline components, each of which performs one or more operations on a block of pixels from a video frame (or a representation thereof). In some embodiments, the techniques described herein may mitigate artifacts caused by skip macroblocks (e.g., ghosting artifacts, trailing artifacts, chroma artifacts in flat color regions, and/or other types of skip artifacts).

In some embodiments, in addition to computing aggregate distortion metrics for the luma component of each macroblock to determine whether or not to designate the macroblock as a skip macroblock, the video encoders described herein may perform additional computations and/or consider other factors when making this decision, and this approach may lead to less visual distortion than existing skip mode decision processes. In some such embodiments, an initial determination that a macroblock (e.g., a portion of a digital video frame) should be designated as a skip macroblock may be generated in a video encoding stage that operates on a representation of the luma component of the macroblock, and may be dependent on one or more aggregate distortion metrics for the macroblock that are computed for the luma component. For example, the video encoder may be configured to compute a sum of absolute differences (SAD), a sum of absolute transformed differences (SATD), or a sum of squared differences (SSD) between pixels of the macroblock and corresponding pixels of a macroblock predictor, and to determine whether the sum is less than a pre-determined skip threshold value for the particular aggregate distortion metric.

Designating the macroblock as a skip macroblock may indicate that the macroblock should be represented in subsequent video encoding stages by the macroblock predictor rather than by coding a motion vector difference and a residual for the macroblock. In some embodiments, if an initial determination that a macroblock should be designated as a skip macroblock is made in a motion estimation stage that operates on a low resolution version of the macroblock (e.g., if an aggregate distortion metric is well below a pre-determined skip threshold value), one or more higher-resolution motion searches may be skipped, bypassed, disabled, or otherwise elided.

In some embodiments, subsequent to generating the initial determination, it may be determined that the macroblock should not be designated as a skip macroblock (e.g., the initial skip mode decision may be reversed or overridden), and the video encoder may be configured to code a motion vector difference and a residual for the macroblock after all. For example, an initial determination that the macroblock should be designated as a skip macroblock may be overridden or reversed if it is determined that the maximum difference between any individual pixel of the macroblock and a corresponding pixel of the macroblock predictor exceeds a pre-determined individual pixel skip threshold or that the difference between an individual pixel of the macroblock and a corresponding pixel of the macroblock predictor exceeds a pre-determined individual pixel skip threshold for at least a pre-defined number of pixels (e.g., for one or more pixels). In some embodiments, the video encoder may be configured to compute the maximum difference between any individual pixel in a particular region within the macroblock (e.g., a cluster of pixels representing a face or another object or image feature of interest) and a corresponding pixel of the macroblock predictor and/or to determine whether the difference between an individual pixel of a particular region within the macroblock and a corresponding pixel of the macroblock predictor exceeds a pre-determined individual pixel skip threshold for at least a pre-defined number of pixels in the particular region.

In another example, subsequent to making an initial determination that a macroblock should be designated as a skip macroblock (e.g., in a video encoding stage that operates on a representation of the luma component of the macroblock), the initial determination may be may be overridden or reversed in a video encoding stage that operates on a representation of a chroma component of the macroblock (e.g., a stage in which aggregate distortion metrics and/or individual pixel difference metrics are computed and compared to one or more applicable skip thresholds). In yet another example, an initial determination that a macroblock should be designated as a skip macroblock may be overridden or reversed if it is determined that the macroblock is the last macroblock on a macroblock row. In various embodiments, even if the video encoder makes an initial determination that a macroblock should be designated as a skip macroblock (e.g., in an early stage of a video encoding pipeline), the video encoder may be configured to pass enough information to subsequent pipeline stages to be able to escape out of the skip mode and to code motion vector and residual components for the macroblock. For example, the video encoder may be configured to send information about motion vector differences, reference frames used, and/or residual coefficients to one or more downstream pipeline stages even if an initial determination indicates that the macroblock should be designated as a skip macroblock.

Figure 1:
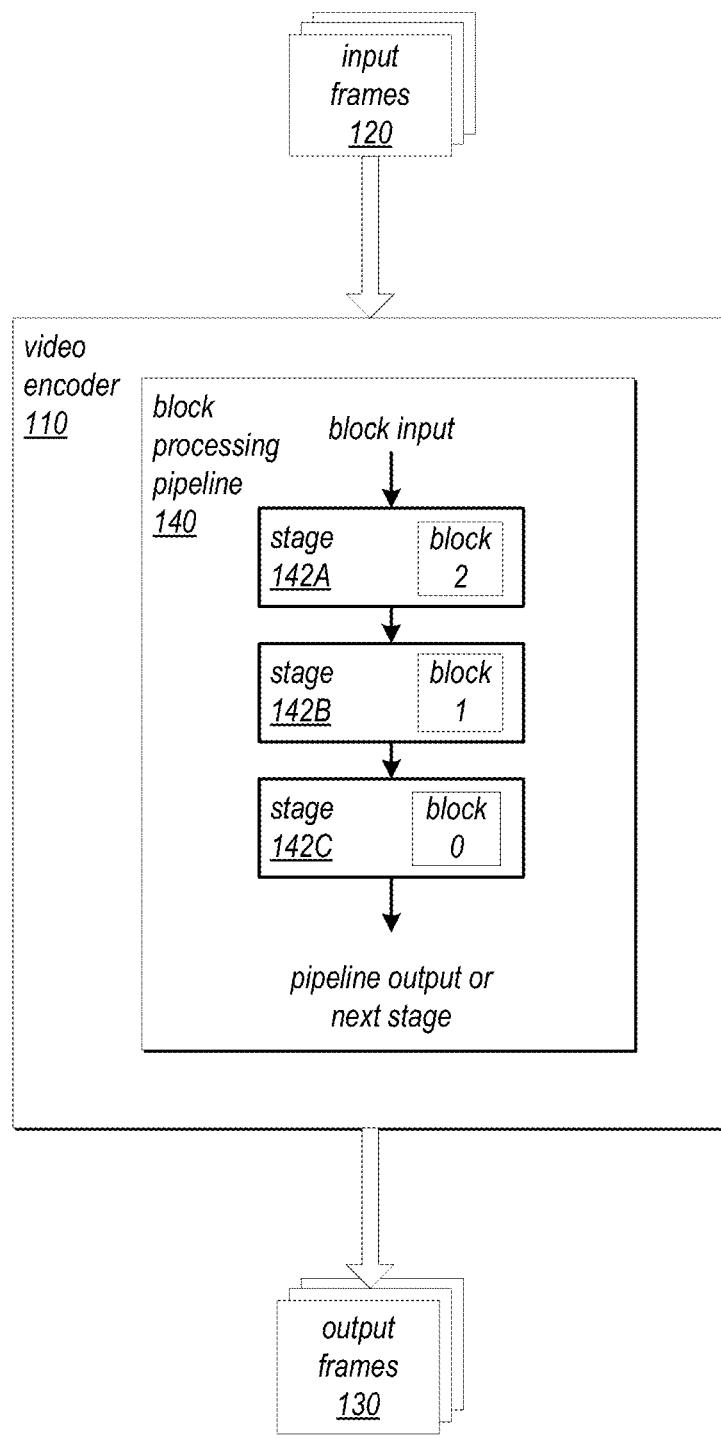
FIG. 1 illustrates an example video encoder including a conventional block processing pipeline that processes blocks from input frames in scan order.
Figure 2:
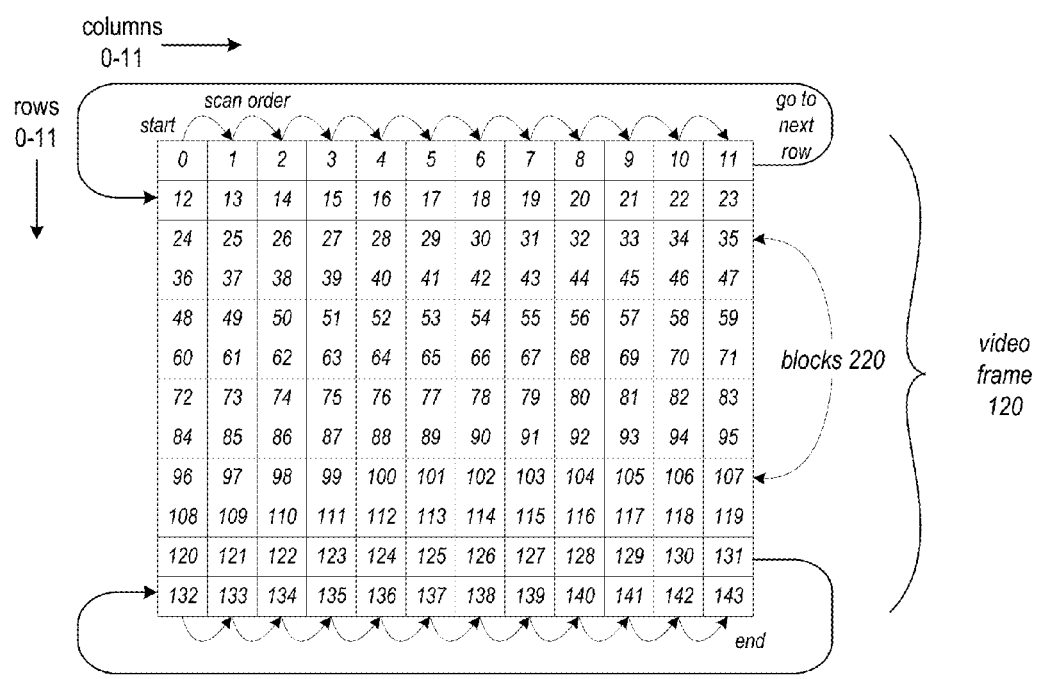
FIG. 2 illustrates conventional scan order processing of blocks from a video frame.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 10:
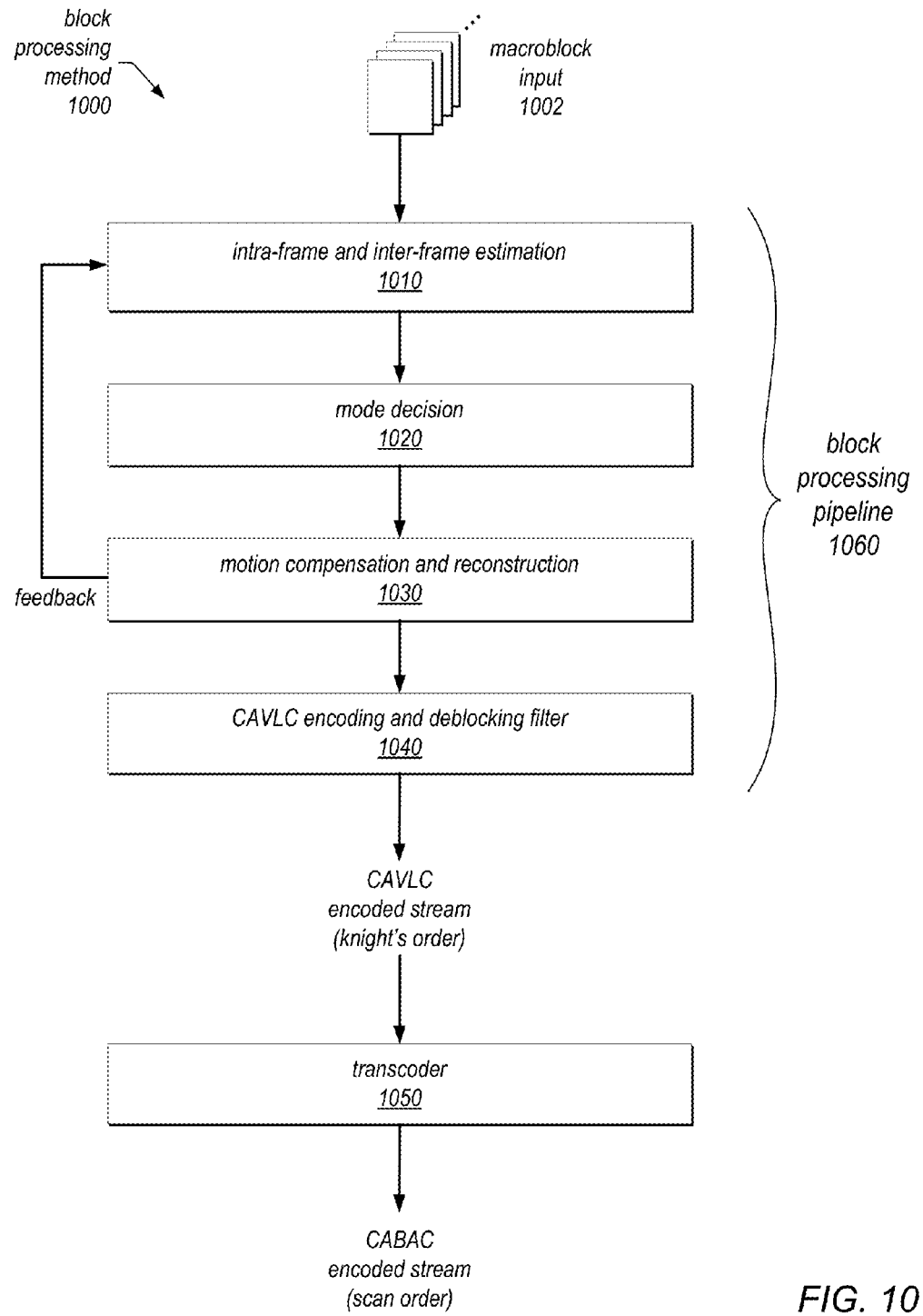
FIG. 10 is a high-level block diagram of general operations in an example block processing method that may be implemented by a block processing pipeline that implements one or more of the block processing methods and apparatus described herein, according to at least some embodiments.
Figure 17:
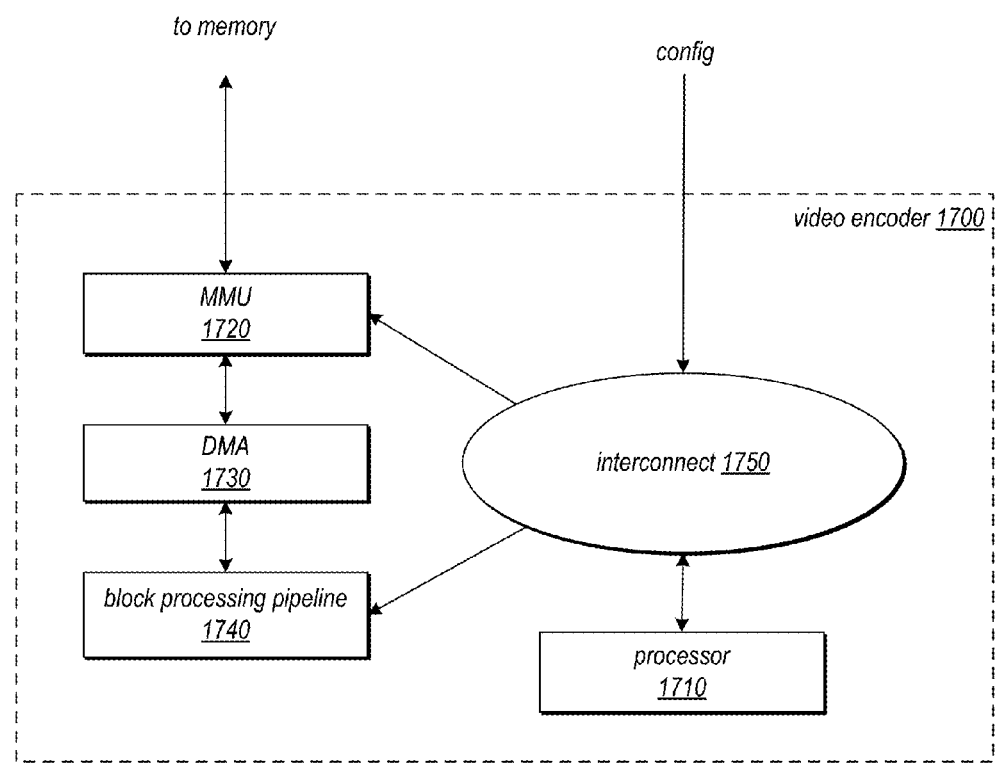
FIG. 17 is a block diagram illustrating an example video encoder apparatus, according to at least some embodiments.

Various embodiments of methods and apparatus for processing digital video frames in block processing pipelines are described. Embodiments of block processing methods and apparatus are generally described herein in the context of video processing in which input video frames are subdivided into and processed according to blocks of elements (e.g., 16×16, 32×32, or 64×64 pixel blocks). Embodiments of an example H.264 video encoder that includes a block processing pipeline and that may implement one or more of the block processing methods and apparatus are described herein. The H.264 video encoder converts input video frames from an input format into H.264/Advanced Video Coding (AVC) format as described in the H.264/AVC standard (the H.264 Recommendation). FIG. 10 illustrates an example block processing pipeline of an example H.264 video encoder, and FIG. 17 illustrates an example H.264 video encoder that includes a block processing pipeline. However, embodiments of the block processing methods and apparatus may be used in encoders for other video encoding formats, for example in block processing pipelines of HEVC (High Efficiency Video Encoding) video encoders that convert input video frames from an input format into HEVC format as described in the HEVC standard. Other video encoders that may use embodiments of the block processing methods and apparatus may include, but are not limited to, H.263, MPEG-2, MPEG-4, and JPEG-2000 video encoders. However, it is to be noted that embodiments of the block processing methods and apparatus may be used in any block processing pipeline, including but not limited to block processing pipelines implemented in various other video encoders and/or decoders (which may be referred to as codecs) in which digital video frames input in one format are encoded or converted into another format. Further note that the block processing methods and apparatus may be used in software and/or hardware implementations of video encoders. In addition to video encoders/decoders, the block processing methods and apparatus described herein may be used in various other applications in which blocks from a video frame or still digital image are processed, for example in pipelines that process still digital images in various image processing applications. Thus, it is to be understood that the term frame or video frame as used herein may also be taken to refer to any digital image.

Embodiments of the block processing methods and apparatus as described herein may be implemented in two or more parallel block processing pipelines. For example, 2, 4, 8, or more pipelines may be configured to run in parallel, with each pipeline processing a quadrow from an input video frame, for example with blocks input according to knight's order.

Embodiments of the block processing methods and apparatus are generally described herein in the context of video processing in which input frames are subdivided into and processed according to blocks of picture elements (referred to as pixels, or pels), specifically 16×16 pixel blocks referred to as macroblocks that are used, for example, in H.264 encoding. However, embodiments may be applied in pipelines in which blocks of other sizes and geometries, or of other elements, are processed. For example, HEVC encoding uses blocks referred to as Coding Tree Units (CTUs) that may vary within the range of 16×16 pixel to 64×64 pixel. In some implementations such as H.264 encoders, the blocks input to the pipeline may be referred to as macroblocks, each macroblock including two or more blocks or partitions that may be processed separately at stages of the pipeline. For example, for input video frames encoded in YUV (e.g., YUV420 format) or YCbCr (e.g., YCbCr 4:2:0, 4:2:2 or 4:4:4 formats) color space, a macroblock may be composed of separate blocks of chroma and luma elements that may be processed separately at stages in a pipeline. In addition to applications that process frames in a pipeline according to blocks of elements (e.g., blocks of pixels), the block processing methods and apparatus may be applied in applications in which digital images (e.g., video frames or still images) are processed by single elements (e.g., single pixels).

Knight's Order Processing

Embodiments of block processing methods and apparatus are described in which, rather than processing blocks in a pipeline according to scan order as in conventional methods, the blocks are input to and processed in the pipeline according to an order referred to herein as "knight's order." Knight's order is in reference to a move of a chess knight piece in which the knight moves one row down and two columns to the left. Note, however, that "knight's order" as used herein more generally encompasses movements of one row down and p columns to the left, where p may be but is not necessarily 2.

Figure 3:
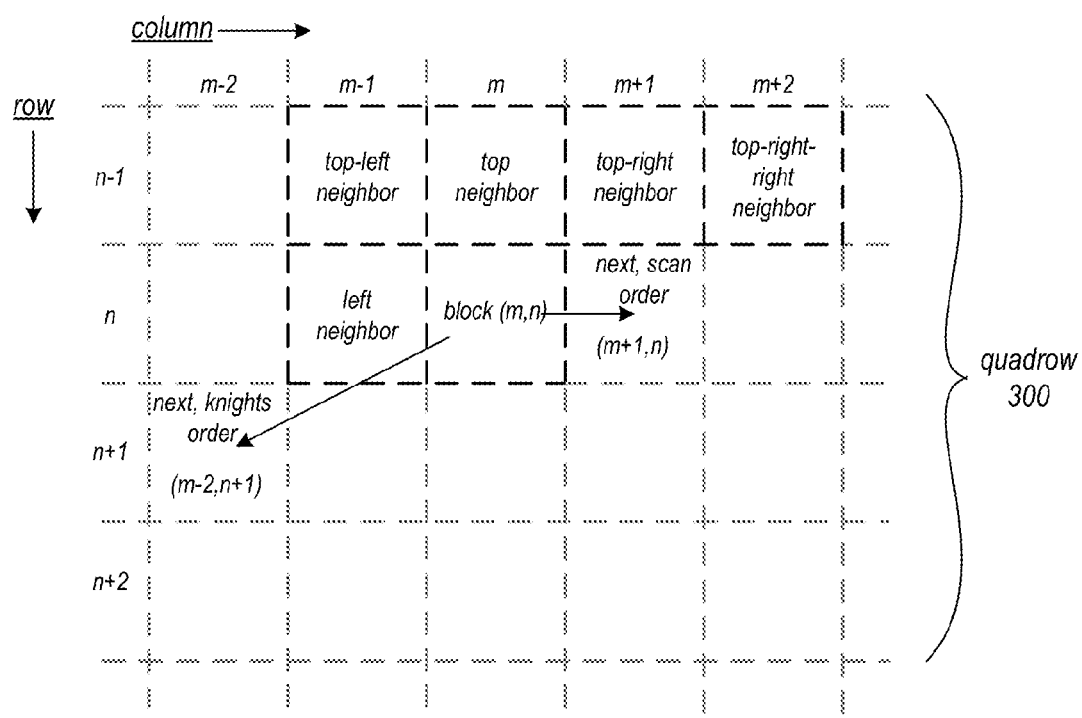
FIG. 3 illustrates neighbor blocks of a current block in a frame, and further illustrates a knight's order processing method for the blocks, according to at least some embodiments.

The knight's order processing method may provide spacing (one or more stages) between adjacent blocks in the pipeline, which, for example, facilitates feedback of data from a downstream stage of the pipeline processing a first block to an upstream stage of the pipeline processing a second block that depends on the data from the first block. One or more stages of a block processing pipeline may require information from one or more other neighbor blocks when processing a given block. FIG. 3 shows neighbors of a current block (m,n) from which information may be required —left (m−1,n); top (m,n−1); top-left (m−1,n−1); top-right (m+1,n−1); and top-right-right (m+2,n−1). These requirements for information from neighbor block(s) may be referred to as dependencies. For example, referring to FIG. 3, information from the left neighbor of block (m,n) may be required to perform a particular operation on the block. In the knight's order processing method, rather than inputting block (m+1, n) into the pipeline immediately after block (m,n), the next block input to the pipeline is block (m−2, n+1). Inputting the blocks into the pipeline in knight's order rather than scan order provides spacing (e.g., one or more stages) between adjacent blocks on a row in the pipeline.

In at least some embodiments of the knight's order processing method, the rows of blocks in the input frame may be divided into sets of four rows, referred to herein as quadrows, with the knight's order processing method constrained by the quadrow boundaries. Referring to FIG. 3 and quadrow 300, when using quadrow boundaries with knight's order processing block (m−1,n) will be four stages downstream when block (m,n) is input to the pipeline, and block (m,n) will be four stages downstream when block (m+1,n) is input to the pipeline. Thus, blocks that are adjacent on a row will be spaced four stages apart in the pipeline. Thus, at stages in which operations are performed on a block that depend on left neighbor information, the information for the left neighbor is more likely to be readily available with less latency than it would be if processing the blocks in scan order. In addition to dependencies on the left neighbor, one or more operations of a block processing method may depend on neighbor blocks from the previous (or above) row such as the top neighbor, top-left neighbor, top-right neighbor, and top-right-right neighbor blocks as shown in FIG. 3. The knight's order processing method with quadrow constraints provides locality of neighbor information that may be leveraged to provide local caching of this neighbor data at each stage in relatively small buffers.

In at least some embodiments, a basic algorithm for determining a next block to input to the pipeline according to the knight's order processing method using quadrow constraints is as follows:

If not on the bottom row of a quadrow:
The next block is two columns left, one row down (−2,+1).
Otherwise, at the bottom row of a quadrow:
The next block is seven columns right, three rows up (+7,−3).

However, the knight's order processing method may also be implemented with other spacing than two blocks left, one block down (−2,+1). For example, instead of two blocks left and one block down, the method may be implemented to go three blocks left and one block down to get the next block. As another example, the method may be implemented to go one block left and one block down (−1,+1) to get the next block. In addition, the knight's order processing method may be implemented with other row constraints than quadrow (four row) constraints. In other words, row groups of at least two rows may be used in embodiments to constrain the knight's order processing method. Assuming r as the number of rows used to constrain the knight's order processing method, the algorithm may be generalized as:

If not on the bottom row of a row group:
The next block is p columns left, one row down (−p,+1).
Otherwise, at the bottom row of a row group:
The next block is q columns right, (r−1) rows up (+q,−(r−1)).

Changing the value of p would affect the value of q, would not affect spacing between adjacent blocks from a row in the pipeline, but would affect spacing between a given block and its other neighbor blocks (e.g., its top-left, top, and top-right neighbors). In particular, note that using the spacing (−1,+1) would result in a block and its diagonal (top-right) neighbor block being concurrently processed at adjacent stages of the pipeline. Thus, a spacing of at least two blocks left may be used so that diagonally adjacent blocks are not concurrently processed at adjacent stages of the block processing pipeline. Changing the value of r would affect the value of q, would affect spacing between adjacent blocks from a row in the pipeline, and would affect spacing between the block and its other neighbor blocks (e.g., its top-left, top, and top-right neighbors).

The above algorithm for determining a next block may begin at an initial block. Upon reaching the end of a quadrow that is followed by another quadrow, the algorithm jumps to the first block of the next quadrow and then crosses over between the quadrow and the next quadrow for a few cycles, resulting in the interleaving of some blocks from the end of the quadrow with some blocks from the beginning of the next quadrow. In other words, the knight's order processing method treats the quadrows as if they were arranged end to end. To avoid complications in the algorithm and to maintain consistent spacing of blocks in the pipeline, at least some embodiments may pad the beginning of the first quadrow and the end of the last quadrow with invalid blocks. An invalid block may be defined as a block that is outside the boundary of the frame and that is input to the pipeline but that does not contain valid frame data, and thus is not processed at the stages. The algorithm for determining a next block may thus begin at an initial block, which may be either the first block in the top row of the first quadrow or an invalid block to the left of the first block in the top row of the first quadrow, proceed through all of the quadrows, and at the end of the last quadrow continue until the last block of the last quadrow has been input to the pipeline. There will be bubbles in the pipeline at the beginning and end of the frame, but the spacing of the valid blocks from the frame in the pipeline will remain consistent throughout. In some embodiments, as an alternative to padding the end of the last quadrow of a video frame with invalid blocks, the last quadrow of a video frame may be overlapped with the first row of the next video frame to be processed in the block processing pipeline.

Figure 4A:
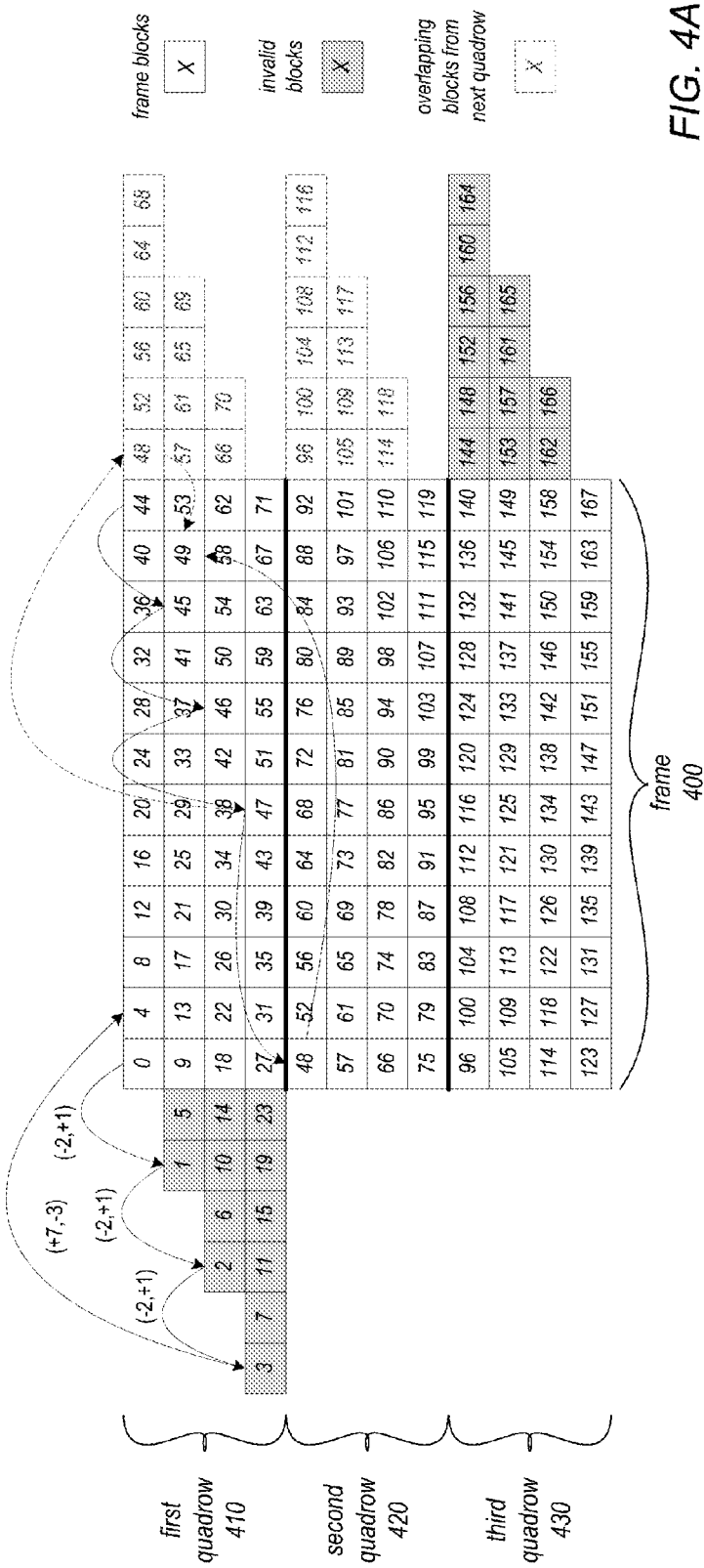
FIGS. 4A and 4B graphically illustrate the knight's order processing method including the algorithm for determining a next block, according to at least some embodiments.
Figure 4B:
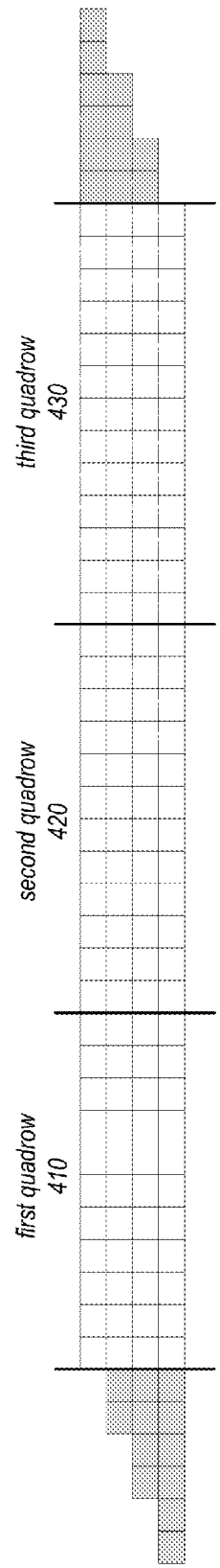

FIGS. 4A and 4B graphically illustrate the knight's order processing method, according to at least some embodiments. For simplicity, these Figures use an example 192×192 pixel frame 400 divided into 144 16×16 pixel blocks, with 12 rows and 12 columns of blocks. However, it is to be noted that the knight's order processing method can be applied to input video frames of any dimensions. In FIG. 4A, an example frame is divided into rows and columns of blocks. The rows of blocks are partitioned into three quadrows (410, 420, and 430) including four rows each. The last three rows of the first quadrow (410) are padded on the left with invalid blocks, and the first three rows of the last (third) quadrow (430) are padded on the right with invalid blocks. In this example, the numbers in the blocks represent the order in which the blocks are input to the block processing pipeline according to the knight's order processing method, beginning with block 0 (the first block in the top row of the first quadrow). Block 0 is input to the first stage of the pipeline, and when the first stage is ready for another block, the method proceeds by going two columns left, one row down to get the next block for input (block 1, in FIG. 4A). This pattern is repeated until reaching the bottom of the quadrow. At the bottom of the quadrow, the method goes seven columns right, three rows up to get the next block. This continues until all of the blocks in the frame (as well as all of the invalid blocks shown in FIG. 4A) are input into the pipeline. When the end of a quadrow is reached, if there is another quadrow after the quadrow the input algorithm proceeds to the beginning of the next quadrow. In this example, after block 47 is input, the method proceeds to block 48 (the first block in the top row of the second quadrow). As shown by the dashed arrow from block 47 to the dashed rectangle labeled 48 to the right of block 44, the first block of the top row of the second quadrow (block 48) is treated as being immediately to the right of the last block of the top row of the first quadrow (block 44), and thus is reached from block 47 by going seven columns right, three columns up. In other words, the knight's order processing method treats the quadrows 410, 420, and 430 as if they were arranged end to end, with invalid blocks at each end, as shown in FIG. 4B. Thus, the algorithm for determining a next block remains the same across the entire frame 400.

In some embodiments, each row of the first quadrow may be padded with extra invalid blocks, for example with two extra invalid blocks. Instead of beginning with the first block in the top row of the first quadrow as shown in FIG. 4A, input to the pipeline may begin with the first invalid block to the left of the first block in top row of the first quadrow.

Figure 5A:
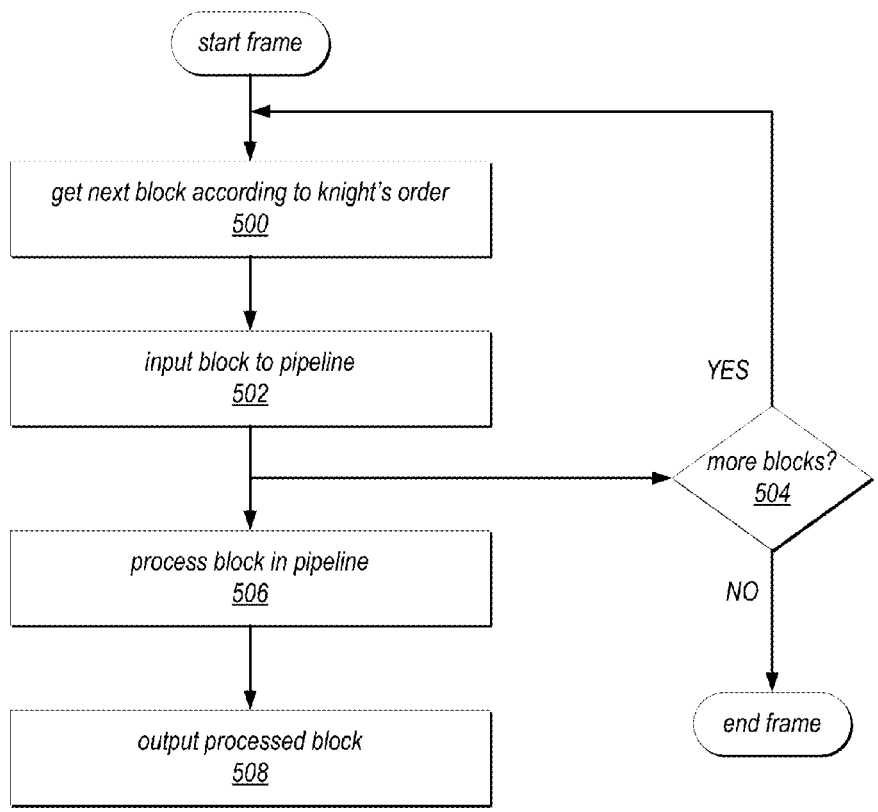
FIGS. 5A and 5B are high-level flowcharts of a knight's order processing method for a block processing pipeline, according to at least some embodiments.
Figure 5B:
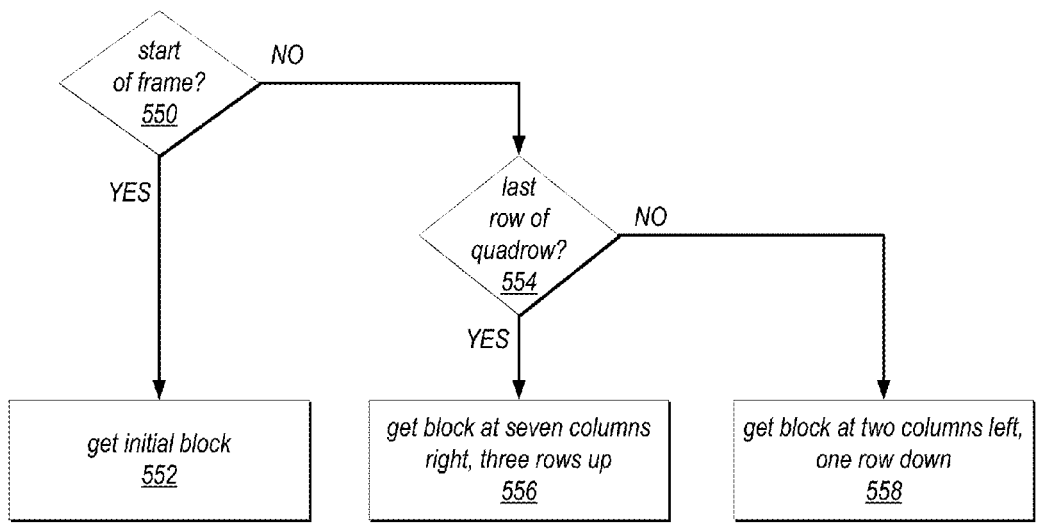

FIGS. 5A and 5B are high-level flowcharts of a knight's order processing method for a block processing pipeline, according to at least some embodiments. In FIG. 5A, as indicated at 500, a next block is determined according to the algorithm for determining a next input block that is implemented by the knight's order processing method. As indicated at 502, the block is input to the pipeline, for example from a memory via direct memory access (DMA). As shown by 504, the input process of elements 500 and 502 continues as long as there are blocks to be processed. Each block that is input to the pipeline by elements 500 and 502 is processed in the pipeline, as indicated at 506. Each block is initially input to a first stage of the pipeline, processed, output to a second stage, processed, and so on. When a block moves from a stage to a next stage of the pipeline, the stage can begin processing the next block in the pipeline. Thus, the input blocks move through the stages of the pipeline, with each stage processing one block at a time. As indicated at 508, once a block has been processed by a last stage of the pipeline, the processed block is output, for example to a memory via direct memory access (DMA).

FIG. 5B is a flowchart of an example algorithm for determining a next input block that that may be implemented by the knight's order processing method, and expands on element 500 of FIG. 5A. FIG. 5B assumes that the frame is divided into quadrows, and that the algorithm used to determine the next frame is two columns left, one row down (−2,+1) if not on the bottom row of a quadrow, seven columns right, three rows up (+7,−3) if on the bottom row. However, other row groupings and/or spacing algorithms may be used. At 550, if at the start of the frame, the method gets an initial block as indicated at 552. If this is not the start of the frame, then at 554, if this is the last row of the quadrow, the next block is seven columns right, three rows up, as indicated at 556. If this is not the last row of the quadrow, the next block is two columns left, one row down, as indicated at 558.

Caching Neighbor Data

One or more operations performed at stages of a block processing pipeline may depend on one or more of the neighbor blocks from the previous (or above) row of blocks such as the top neighbor, top-left neighbor, top-right neighbor, and top-right-right neighbor blocks, as well as on the left neighbor, as shown in FIG. 3. The knight's order processing method with quadrow constraints provides locality of neighbor information that may be leveraged to provide local caching of neighbor data at each stage of the pipeline in relatively small local buffers. For example, in some embodiments, the cached neighbor data may include source transform coefficients (e.g., DC transform coefficients), modified transform coefficients, previously computed quantization errors, and/or weighting coefficient values for one or more neighbor pixels. In at least some embodiments, the local buffers may be implemented using SRAM (static random access memory) technology. However, the local buffers may be implemented using other memory technologies in some embodiments.

Note that blocks in the first column of a frame do not have a left or top-left neighbor, blocks in the last column do not have a top-right or top-right-right neighbor, and blocks in the next-to-last column do not have a top-right-right neighbor. Thus, for block processing methods that use information from these neighbor positions, the information in the local buffers for these neighbor positions relative to blocks in those columns is not valid and is not used in processing the blocks in those columns in the stages of the pipeline. In addition, there are no rows above the top row of the first quadrow, so the blocks in this row do not have top, top-left, top-right, and top-right-right neighbors.

In at least some embodiments of a block processing pipeline that implements the knight's order processing method, a first buffer of sufficient size to cache the C most recently processed blocks on the current quadrow may be implemented at each of one or more stages of the pipeline. This buffer may be referred to as the current quadrow buffer, and may, for example, be implemented as a circular FIFO buffer. In at least some embodiments, C may be determined such that the buffer includes an entry corresponding to the top-left neighbor of the current block at the stage according to the algorithm for determining a next block and the row group size used to constrain the knight's order method. The buffer may also include entries corresponding the top-right-right, left, top-right, and top neighbors for the current block according to the algorithm. When processing a block, a stage may access the current quadrow buffer to obtain neighbor information for the block if that block's neighbor information is valid in the current quadrow buffer. Note that some block processing methods may not require top-left neighbor information, and the current quadrow buffer may be smaller in these implementations.

When a stage completes processing of a block, the block's information is written to the last position in the current quadrow buffer, overwriting the entry at the position of the block's top-left neighbor, thus preparing the buffer for the next block to be processed at the stage. Note that, initially, at the beginning of a frame, there is no information in the current quadrow buffer as no blocks in the frame have been processed, so no block information will be overwritten in the buffer until the buffer is filled. When the next block is at the stage, the previous block's information in the buffer is the block's top-right-right neighbor information.

Figure 6:
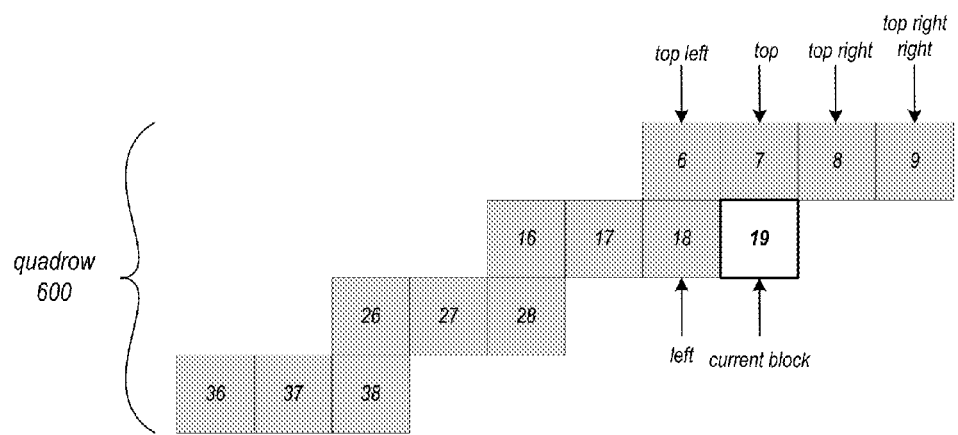
FIG. 6 illustrates a portion of a quadrow as processed in a pipeline according to the knight's order processing method that may be cached in the current quadrow buffer, according to at least some embodiments FIG. 7 graphically illustrates blocks in a current quadrow being processed according to the knight's order processing method, as well as neighbor blocks in the last row of the previous quadrow that may be cached in a previous quadrow buffer, according to at least some embodiments.

For example, using quadrow boundaries and the algorithm for determining a next block where the next block is two columns left, one row down if not on the bottom row of a quadrow, C=13 would be sufficient to include the top-left neighbor of the current block, as the spacing between the current block and its top-left neighbor is 13. FIG. 6 shows a portion of a quadrow 600 as processed in a pipeline according to the knight's order processing method that may be cached in the current quadrow buffer, according to at least some embodiments. Block 19 represents a current block at a stage. The shaded blocks represent the 13 most recently processed blocks by the stage. Note that the farthest block from block 19 in time is its top-left neighbor (block 6), and the nearest block in time is its top-right-right neighbor (block 9).

For the blocks in the top row of a quadrow, information for neighbors in the row above is not in the current quadrow buffer. There are no rows above the top row of the first quadrow, and for all other quadrows the row above the top row is the bottom row of the previous quadrow. Thus, the current quadrow buffer includes the left neighbor information for all blocks in the top row of a quadrow (except for the first block, which has no left neighbor), but does not include the top-left, top, top-right, and top-right-right neighbor information for the blocks in the top row of the quadrow. To provide this neighbor information for blocks on the top rows of the quadrows, a second buffer of sufficient size to hold information for the required neighbor blocks from the last row of the previous quadrow may be implemented at one or more stages of the pipeline. This buffer may be referred to as the previous quadrow buffer, and may, for example, be implemented as a circular FIFO buffer. The number of entries in the previous quadrow buffer, as well as the particular neighbor blocks that are cached in the previous quadrow buffer, may be dependent on the requirements of the particular block processing method that is implemented by the block processing pipeline. In at least some embodiments, when processing a quadrow according to the knight's order processing method, information for each block on the bottom row of the quadrow may be written to an external memory, for example when the block is at a last stage of the pipeline. For each block in the top row of a quadrow, neighbor (e.g., top-right-right neighbor) data may be read from the external memory, for example at a first stage of the pipeline. This neighbor information may be passed down the pipeline to the other stages along with the corresponding block from the top row.

Figure 7:
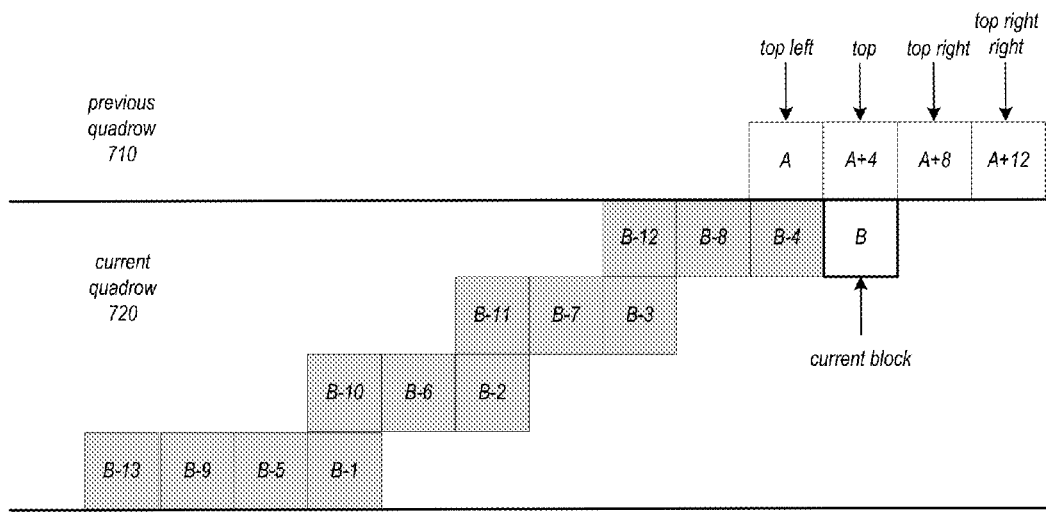

FIG. 7 graphically illustrates blocks in a current quadrow 720 being processed according to the knight's order processing method, as well as neighbor blocks in the last row of the previous quadrow 710, according to at least some embodiments. Blocks A, A+4, A+8, and A+12 were processed on the previous quadrow according to the knight's order processing method. Block A was processed first, block A+4 was processed four cycles later, and so on. Block B represents a block on the current quadrow that is currently at a particular stage of the pipeline. Blocks B–1 (B minus 1) through B–13 (B minus 13) represent the thirteen blocks that were most recently processed at the stage in the current quadrow. Information from these blocks may be presently cached in the stage's current quadrow buffer, with B–1 as the most recent entry and B–13 as the oldest entry. B–4 is current block B's left neighbor. However, block B's top-left (block A), top (block A+4), top-right (block A+8), and top-right-right (block A+12) neighbors are on the bottom row of the previous quadrow, and are not included in the current quadrow buffer for block B. In at least some embodiments, to provide neighbor information for blocks on the top row of the current quadrow (e.g., top-left, top, top-right, and top-right-right neighbor information), a previous quadrow buffer may be implemented at each of one or more stages of the pipeline. When processing a quadrow, information for each block on the bottom row of the quadrow is written to a neighbor data structure in external memory, for example by a last stage of the pipeline. When processing blocks from the top row of a next quadrow, information for neighbor blocks in the bottom row of the previous quadrow is read from the external memory, for example by a first stage of the pipeline, and passed down the pipeline to other stages with the top row blocks. In at least some embodiments, information for the top-right-right neighbor block of a block in the top row is read from the external memory. In at least some embodiments, the previous quadrow buffer is a circular buffer, and an oldest entry in the previous quadrow buffer is replaced with the neighbor information that is read from the external memory. In various embodiments, the external memory to which blocks in the bottom row are written and from which neighbor block information is read may be a memory of the pipeline component that is external to the last stage, a memory of a video encoder that implements the pipeline, or a memory external to the video encoder. In some embodiments, however, the memory may be a local memory of the last stage of the pipeline. At least some embodiments may include an interlock mechanism to control the reads and writes to the external memory between rows to avoid overwriting the data in external memory.

Figure 8:
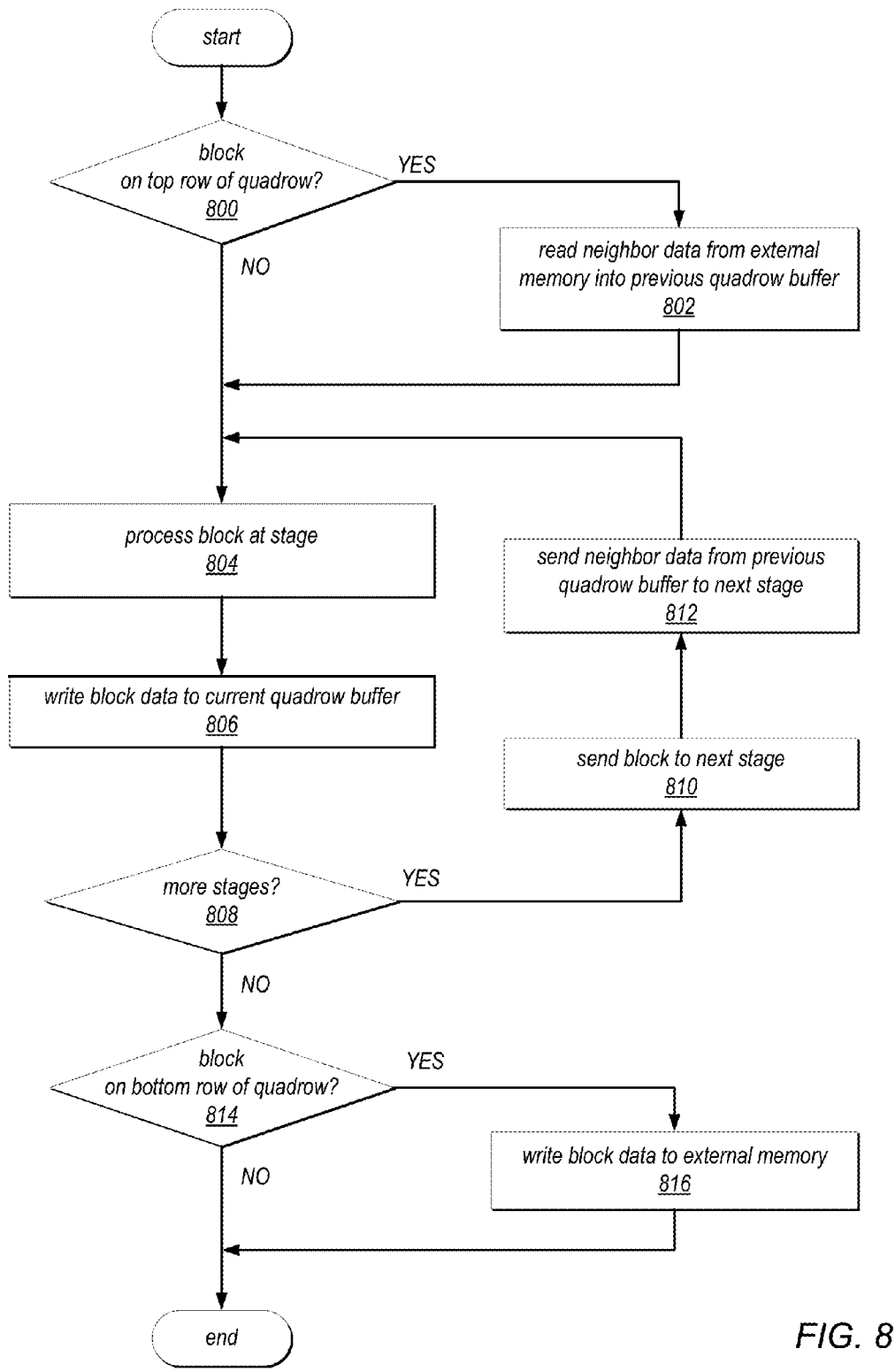
FIG. 8 is a flow diagram illustrating a method for processing blocks in a block processing pipeline in which neighbor data is cached in local buffers at the stages of the pipeline, according to at least some embodiments.

FIG. 8 is a flow diagram illustrating a method for processing blocks in a block processing pipeline in which neighbor data is cached in local buffers at the stages of the pipeline, according to at least some embodiments. For example, the method of FIG. 8 may be used at element 506 of FIG. 5A to process blocks input to the pipeline according to the knight's order processing method as shown at elements 500, 502, and 504 of FIG. 5A. In FIG. 8, a block is input to the pipeline. At 800, at a first stage of the pipeline, if the block is on the top row of a quadrow, then neighbor data for the block may be read from external memory (for example, via DMA) into a previous quadrow buffer as indicated at 802. In at least some embodiments, the neighbor data corresponds to the top-right-right neighbor of the current block on the bottom row of the previous quadrow. As indicated at 804, the block is then processed at the current stage. If an operation at the stage requires neighbor information to process the block, the stage may use the neighbor information in the current quadrow buffer and/or in the previous quadrow buffer to perform the operation. If the block is on the top row of a quadrow, then at least some of the neighbor information is obtained from the previous quadrow buffer; otherwise, neighbor information may be obtained from the current quadrow buffer. As indicated at 806, information about the current block may be written to the current quadrow buffer at the stage for use on subsequent blocks. The information may overwrite an oldest entry in the current quadrow buffer.

At 808, if there are more stages, then the block may be sent to a next stage, as indicated at 810. At 812, neighbor information from the previous quadrow buffer may also be sent to the next stage. In at least some embodiments, this neighbor information is only sent to the next stage if the current block is on the top row of a quadrow. Elements 804 through 812 may be repeated until the block reaches and is processed by a last stage of the pipeline. At 808, if there are no more stages, then processing of the block in the pipeline is done. At 814, if the block is on the bottom row of a quadrow, then information for the block is written to an external memory (for example, via DMA) to be read as neighbor data for blocks in the top row of a next quadrow. In addition, all of the processed valid blocks are output as shown by element 508 of FIG. 5A.

Example Pipeline Units

Figure 9A:
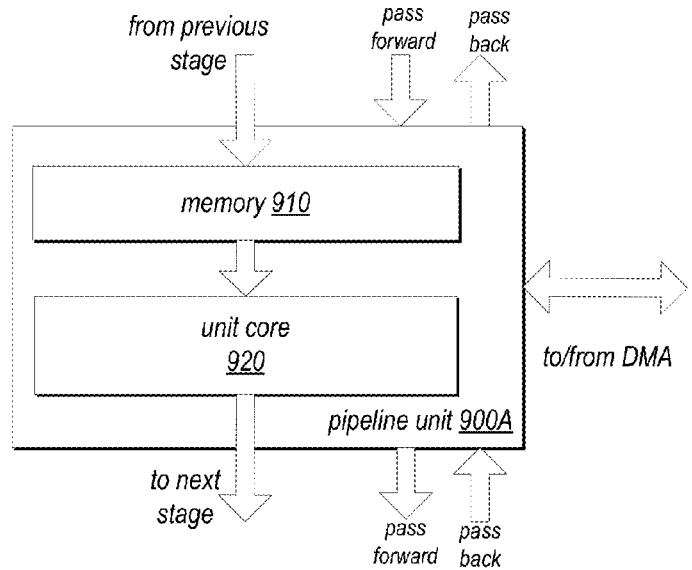
FIGS. 9A and 9B are block diagrams of example pipeline processing units that may be used at the stages of a block processing pipeline that implements one or more of the block processing methods and apparatus as described herein, according to at least some embodiments.
Figure 9B:
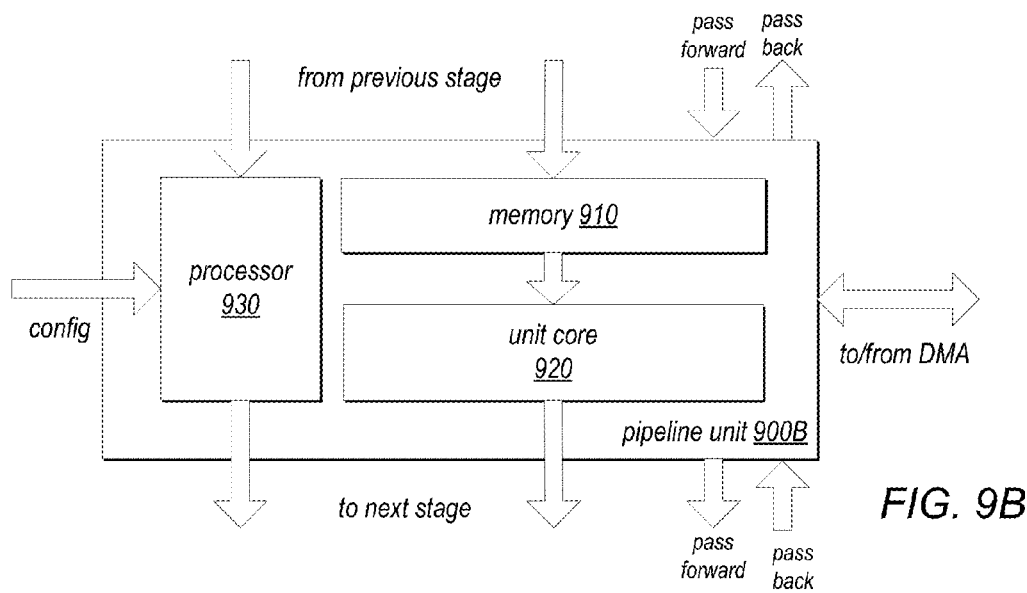
Figure 9C:
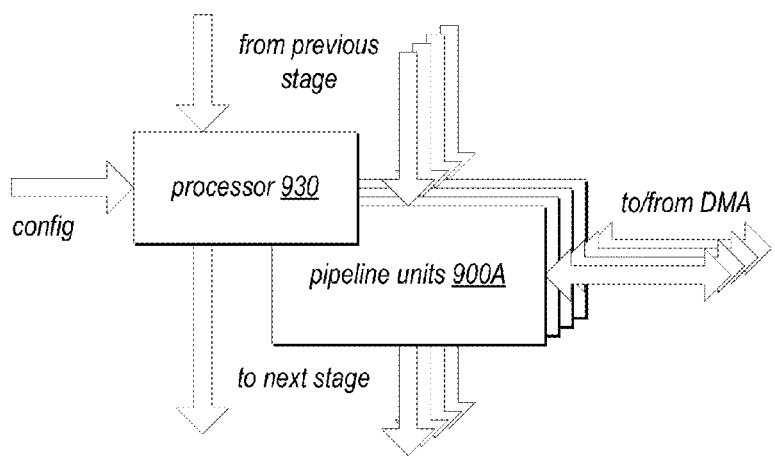
FIG. 9C illustrates that a single processor may be associated with a group of two or more pipeline units, according to at least some embodiments.

FIGS. 9A through 9C are block diagrams of example pipeline processing units that may be used at the stages of a block processing pipeline that implements one or more of the block processing methods and apparatus as described herein, according to at least some embodiments. For example, one or more of pipeline units 900A and/or 900B as shown in FIGS. 9A and 9B may be used at each stage of the example block processing pipeline shown in FIG. 10. Note that FIGS. 9A through 9C are not intended to be limiting; a pipeline processing unit may include more or fewer components and features than those shown in the Figures.

As shown in FIG. 9A, a pipeline unit 900A may include at least a memory 910 and a unit core 920. Unit core 920 may be a component (e.g., a circuit) that is configured to perform a particular operation on or for a block, or a portion of a block, at a particular stage of the block processing pipeline. Memory 910 may, for example, be a double-buffered memory that allows the unit core 920 to read and process data for a block from the memory 910 while data for a next block is being written to the memory 910 from a previous pipeline unit.

As shown in FIG. 9B, a pipeline unit 900B, in addition to a memory 910 and unit core 920 as shown in FIG. 9A, may also include a processor 930. Processor 930 may, for example, be a mobile or M-class processor. The processors 930 in pipeline units 900B of a block processing pipeline may, for example, be used to control the block processing pipeline at block boundaries. The processors 930 in pipeline units 900B may be configurable, for example with low-level firmware microcode, to allow flexibility in algorithms that are implemented by the block processing pipeline for various applications. In at least some embodiments, a processor 930 of a pipeline unit 900B in the pipeline may be configured to receive data from a processor 930 of a previous (upstream) pipeline unit 900B and send data to a processor 930 of a subsequent (downstream) pipeline unit 900B. In addition, a processor 930 of a pipeline unit 900B at a last stage of the pipeline may be configured to send feedback data to a processor 930 of a pipeline unit 900B at a first stage of the pipeline.

As shown in FIGS. 9A and 9B, a pipeline unit 900A or 900B may be configured to access external memory, for example according to direct memory access (DMA). In addition, a pipeline unit 900A or 900B may be configured to pass information back to one or more previous (upstream) stages of the pipeline and/or to receive information passed back from one or more subsequent (downstream) stages of the pipeline. In addition, a pipeline unit 900A or 900B may be configured to pass information forward to one or more subsequent (downstream) stages of the pipeline and/or to receive information passed forward from one or more previous (upstream) stages of the pipeline.

As shown in FIG. 9C, two or more units 900A as shown in FIG. 9A may be grouped together and configured to perform an operation in the pipeline. A single processor 930 may be used to control and/or configure the pipeline units 900A.

Example Block Processing Pipeline

FIG. 10 is a high-level block diagram of general operations in an example block processing method 1000 for H.264 encoding that may be implemented in stages by a block processing pipeline that may implement one or more of the block processing methods and apparatus as described herein, according to at least some embodiments. A block processing pipeline that implements the block processing method 1000 may, for example, be implemented as a component of an H.264 video encoder apparatus that is configured to convert input video frames from an input format into H.264/Advanced Video Coding (AVC) format as described in the H.264/AVC standard. The H.264/AVC standard is published by ITU-T in a document titled "ITU-T Recommendation H.264: Advanced video coding for generic audiovisual services", which may be referred to as the H.264 Recommendation. An example input video format is 1080p (1920× 1080 pixels, 2.1 megapixels) encoded in YCbCr color space. However, other input video formats may be encoded into H.264 using embodiments of the pipeline in a video encoder apparatus.

Figure 18:
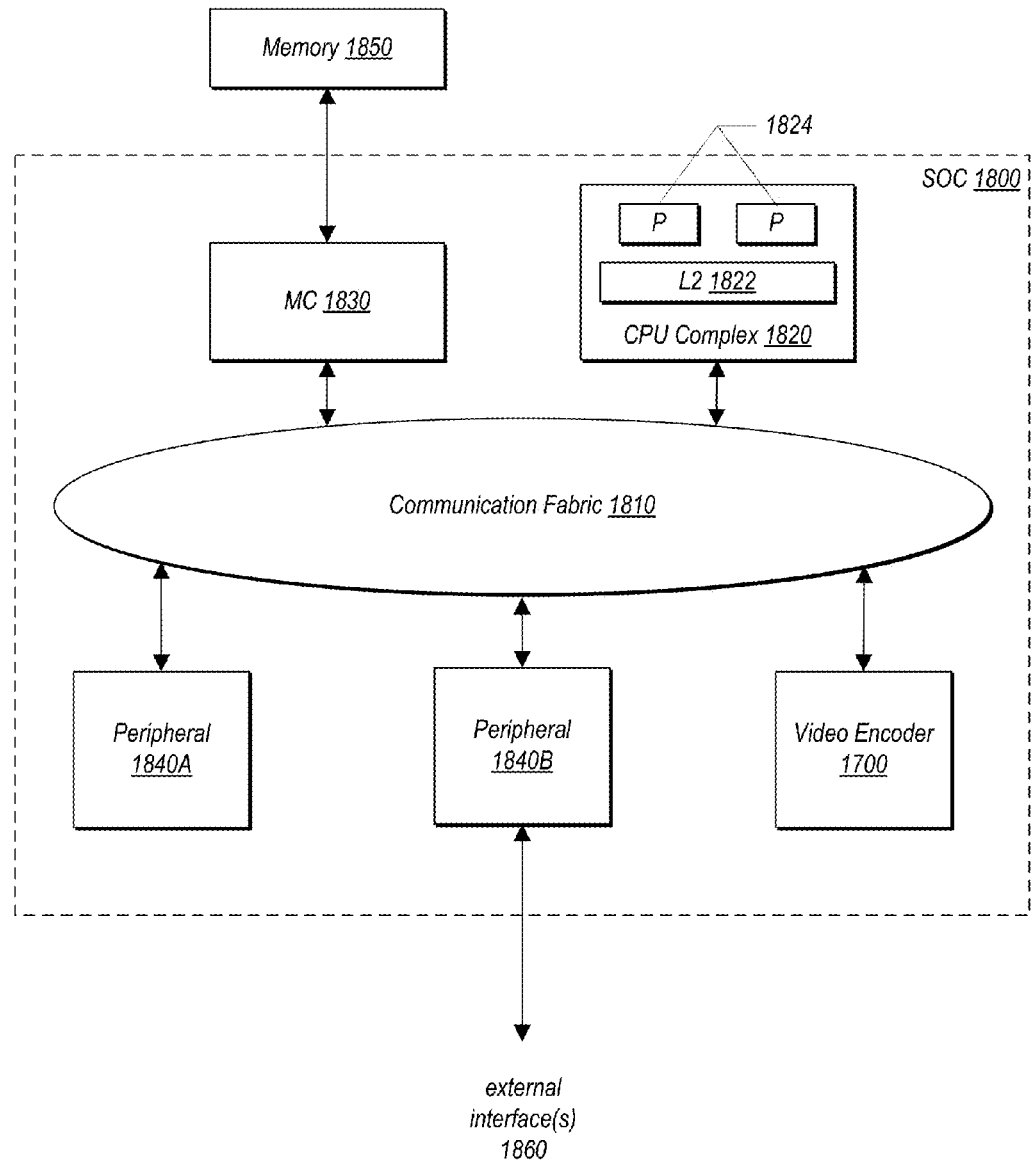
FIG. 18 is a block diagram illustrating one embodiment of a system on a chip (SOC) that includes a video encoder.

The video encoder apparatus may, for example, be implemented as an integrated circuit (IC) or as a subsystem on an IC such as a system-on-a-chip (SOC). In at least some embodiments, the video encoder apparatus may include at least a pipeline component, a processor component (e.g., a low-power multicore processor), and a bus subsystem or fabric that interconnects the functional components of the apparatus. The processor component of the video encoder apparatus may, for example, perform frame-level control of the pipeline such as rate control, perform pipeline configuration, and interface with application software via a driver. The pipeline component may implement multiple processing stages each configured to perform a portion or all of one or more of the operations as shown in FIG. 10, each stage including one or more processing units. At least one of the processing units in the pipeline may include a processor component (e.g., an M-class processor) that may, for example, configure parameters of the processing unit at the respective stage at the macroblock level. The video encoder apparatus may include other functional components or units such as memory components, as well as external interfaces to, for example, one or more video input sources and external memory. Example video input sources to the video encoder apparatus may include one or more of, but are not limited to, a video camera for raw video input processing, a decoder apparatus for re-encoding/transcoding, a flash or other memory, and a JPEG decoder. An example video encoder apparatus is illustrated in FIG. 17. An example SOC that includes a video encoder apparatus is illustrated in FIG. 18. While embodiments are generally described in relation to hardware implementations of a block processing pipeline that implements the block processing method 1000 with knight's order processing, note that the block processing method 1000 with knight's order processing may be implemented by a block processing pipeline implemented in software.

A pipeline that implements the method 1000 as shown in FIG. 10 may process 16×16 pixel macroblocks from input video frames according to the H.264 standard, each macroblock including two or more blocks or partitions that may be processed separately at stages of the pipeline. The input video frames may, for example, be encoded in YCbCr color space; each macroblock may be composed of separate blocks of chroma and luma elements that may be processed separately at the stages of the pipeline. A pipeline that implements the block processing method 1000 may receive input macroblocks from and output processed macroblocks to a memory. The memory may include memory of the video encoder apparatus and/or memory external to the video encoder apparatus. In at least some embodiments, the memory may be accessed by the pipeline as necessary, for example via direct memory access (DMA). In at least some embodiments, the memory may be implemented as a multi-level memory with a cache memory implemented between the pipeline and an external memory. For example, in some implementations, one or more quadrows may be read from an external memory and cached to the cache memory for access by the pipeline to reduce the number of reads to an external memory.

The general operations of the example H.264 video encoder method 1000 as shown in FIG. 10 that may be performed in stages by a pipeline, as well as general data flow through the pipeline, are briefly described below. Each of the general operations of the method 1000 may be implemented by one or more pipeline units at one or more stages of the pipeline. Example pipeline units are illustrated in FIGS. 9A through 9C. Also note that each general operation shown in FIG. 10 may be subdivided into two or more operations that may be implemented by pipeline units at one, two, or more stages of the pipeline. However, two or more of the operations shown in FIG. 10 may be performed at the same stage of the pipeline. Each stage in the pipeline processes one macroblock at a time, and thus two or more of the operations may simultaneously operate on the same macroblock that is currently at the respective stage. Note that a pipeline may perform more, fewer, or other operations than those shown in FIG. 10 and described below.

Macroblock Input

In at least some embodiments, macroblock input 1002 may be performed by an initial stage of the pipeline. In at least some embodiments, macroblock input 1002 receives luma and chroma pixels from a memory, for example via DMA, computes statistics on input pixels that are used by firmware in downstream stages of the pipeline, and buffers input macroblocks to enable firmware look ahead. The input macroblock pixel data and corresponding statistics are buffered and sent to one or more downstream stages of the pipeline that implement intra-frame and inter-frame estimation 1010 operations. In at least some embodiments, an input buffer of up to 16 macroblocks is maintained for input pixels and statistics. In at least some embodiments, the macroblock pixel data and corresponding statistics may be input to downstream stages of the pipeline according to a knight's order input algorithm as previously described in the section titled Knight's Order Processing.

In at least some embodiments, macroblock input 1002 reads neighbor data from the bottom row of a previous quadrow from memory at quadrow boundaries and passes the neighbor data to at least one downstream stage.

Intra-Frame and Inter-Frame Estimation

Intra-frame and inter-frame estimation 1010 operations may determine blocks of previously encoded pixels to be used in encoding macroblocks input to the pipeline. In H.264 video encoding, each macroblock can be encoded using blocks of pixels that are already encoded within the current frame. The process of determining these blocks may be referred to as intra-frame estimation, or simply intra-estimation. However, macroblocks may also be encoded using blocks of pixels from one or more previously encoded frames (referred to as reference frames). The process of finding matching pixel blocks in reference frames may be referred to as inter-frame estimation, or more generally as motion estimation. Intra-frame and inter-frame estimation 1010 operations may be subdivided into two or more sub-operations that may be performed at one, two, or more stages of the pipeline, with one or more components or pipeline units at each stage configured to perform a particular sub-operation.

In at least some embodiments, macroblock input 1002 reads neighbor data from the bottom row of a previous quadrow from memory at quadrow boundaries and passes the neighbor data to intra-frame and inter-frame estimation 1010, for example to an intra-frame estimation component. In addition, motion compensation and reconstruction 1030, for example a luma reconstruction component, may pass neighbor data as feedback to intra-frame and inter-frame estimation 1010, for example to the intra-frame estimation component.

Motion Estimation

As noted above, motion estimation may include receiving the input macroblock and performing a search for matching blocks in stored reference frame data to find a best match. More specifically, a macroblock may be partitioned in different ways within the H.264 standard, and motion estimation may include determining what the best partition is. For example, for each partition within the macroblock, there may be a suitable reference for the macroblock within one of n previous frames. To determine what the reference should be, the motion estimation component may be configured to search around this macroblock (e.g., to define a search window in the reference frame) using any of a variety of applicable search strategies. For example, in an exhaustive search strategy, every pixel offset may be searched and a metric may be computed to determine whether (or not) it is a good reference. Because motion estimation can be one of the most power-intensive operations in a video encoding process, efforts to simplify the search may yield substantial benefits.

In at least some embodiments, to perform motion estimation, the pipeline may include one instance of a motion estimation engine for each reference frame to be searched. Each motion estimation engine searches only one reference frame. In at least some embodiments, each motion estimation engine may include a low resolution motion estimation component, a full pixel motion estimation component, and a subpixel motion estimation component. In at least some embodiments, the three components of each of the motion estimation engines may be implemented at different stages of the pipeline. In at least some embodiments, each motion estimation engine may also include a memory component that reads and stores reference frame data from a memory as needed. In at least some embodiments, a single instance of a processor manages all instances of the motion estimation engine. In at least some embodiments, the processor may determine one or more candidates using predicted and co-located motion vectors and input the candidates to the full pixel motion estimation components of the motion estimation engines.

In at least some embodiments, the low resolution motion estimation component of each motion estimation engine performs an exhaustive search on a scaled-down, low resolution version of a respective reference frame to generate candidates. In at least some embodiments, the full pixel motion estimation component performs a search on full size pixels using the candidates from the low resolution motion estimation component to determine the best candidates from among those received from the low resolution motion component. In at least some embodiments, the subpixel motion estimation component performs a search on half and quarter pixels using the best candidates received from the full pixel motion estimation component. In some embodiments, if, in the low resolution motion estimation stage, it is determined that a given one of the reference candidates is well below a pre-determined skip threshold value, one or more higher-resolution motion estimation searches may be elided. For example, motion estimation may include a direct mode estimation component that receives co-located and spatial motion vector data and computes a direct/skip mode cost. Based on the results, the direct mode estimation component may disable full pixel motion estimation and subpixel motion estimation. In at least some embodiments, each motion estimation engine outputs results data to mode decision 1020.

In at least some embodiments, motion estimation receives one or more predicted motion vectors for the current macroblock from the mode decision component 1020. These motion vectors may be used to compute the cost function to determine the best motion vector. For example, in some embodiments, the following predicted motion vectors are passed to the motion estimation component from mode decision 1020:

1. 16×16
2. 16×8
3. 8×16
4. 8×4
5. 4×8

In at least some embodiments, motion estimation outside frame boundaries may be implemented by the motion estimation reference frame memory. In such embodiments, when motion vectors are pointing outside of the reference frame, edge pixels may be replicated. The motion estimation reference frame memory may also be configured to service requests for interpolated macroblock data from the mode decision component and/or from the luma reconstruction component. For example, in response to a request for a subpixel motion vector, the reference frame memory may return the interpolated block corresponding to the motion vector. In some embodiments, 4×4 and 8×8 block requests may be supported.

In at least some embodiments, the motion estimation search parameters may include various SAD (Sum of Absolute Differences), SATD (Sum of Absolute Transformed Differences), or SSD (Sum of Squared Differences) distortion metrics that are computed for the low resolution motion estimation, for the full pixel motion estimation, and/or for the subpixel motion estimation. In some embodiments, these aggregate metrics may also be used to determine whether the input macroblock should be designated as a skip macroblock, in which case the macroblock would be represented in one or more subsequent video encoding stages by a macroblock predictor rather than by a motion vector difference and a residual. For example, if the value of one of these aggregate metrics is below a pre-determined threshold, the macroblock may be designated as a skip macroblock.

As described in more detail below, in some embodiments, additional metrics may be computed for each candidate that represent differences between individual pixels in the input macroblock and the corresponding pixels in the reference frame, the number of individual pixels for which the difference between the pixel in the input macroblock and the corresponding pixel in the reference frame exceeds a maximum value for individual pixel differences, the maximum difference between any pixel in the input macroblock and the corresponding pixel in the reference frame, or the maximum difference between any pixel in a designated portion of the input macroblock (e.g., a region or object of interest in the video frame) and the corresponding pixel in the reference frame. In some embodiments, even if the value of one of the aggregate metrics is below a pre-determined threshold, the macroblock may not be designated as a skip macroblock if the value of the additional individual pixel metric is not also below a pre-determined threshold. For example, in some embodiments, if the maximum individual difference metric for any of the pixels in the macroblock exceeds a pre-determined individual pixel skip threshold and/or the individual difference for at least a pre-defined number of pixels exceeds a pre-determined individual pixel skip threshold, the macroblock may not be designated as a skip macroblock regardless of whether or not the value of any of the aggregate metrics is below its pre-determined skip threshold. However, if the values of all of the applicable aggregate and individual pixel distortion/difference metrics are below their respective pre-determined thresholds, the macroblock may be designated as a skip macroblock and one or more of any remaining motion estimation searches may be bypassed.

Figure 11:
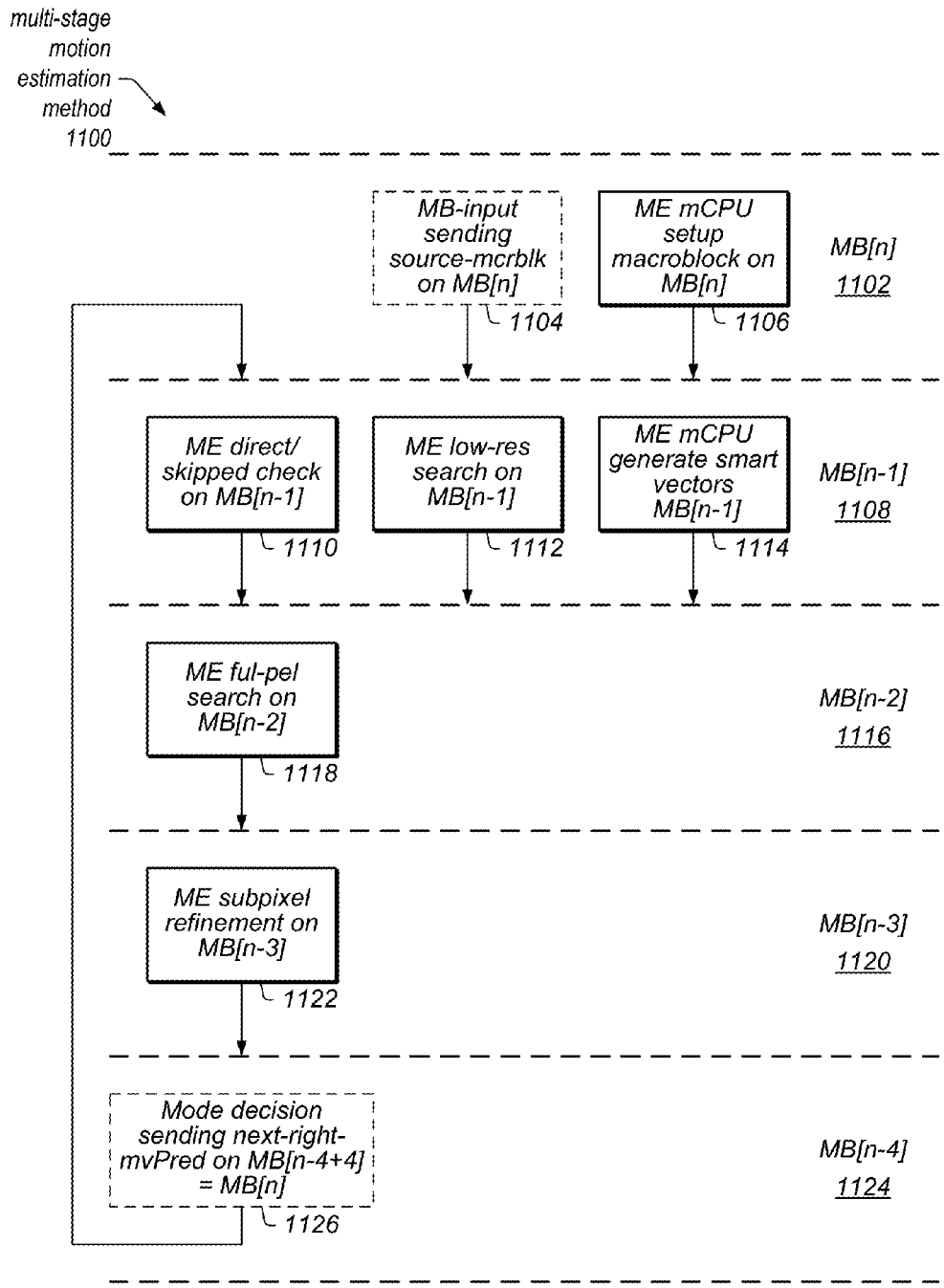
FIG. 11 is a block diagram illustrating a multi-stage motion estimation method of a video encoding apparatus, according to at least some embodiments.

One embodiment of a multi-stage (pipelined) motion estimation method 1100 of a video encoding apparatus is illustrated by the block diagram in FIG. 11. As illustrated in this example, the method may include a first stage 1102, in which inputs to a motion estimation exercise for data representing a most recently received macroblock MB[n] (including, e.g., an input or source macroblock) are received (shown at 1104) and in which the processor that manages all the motion estimation engine instances (sometimes referred to herein as the "mCPU") prepares the data representing macroblock MB[n] for processing (shown at 1106). As illustrated at 1126 in FIG. 11, one of the inputs received for use in processing macroblock MB[n] may be neighbor data for a previously processed macroblock MB[n−4] that is output from a mode decision for macroblock MB[n−4] that was made in stage 1124.

As illustrated in this example, multiple operations may be performed on data representing the most recently received (previous) macroblock MB[n−1] in a second stage 1108. These operations may include a direct mode/skipped mode check (1110), in which a determination (e.g., an initial determination or a final determination) is made about whether to designate the macroblock as a skip macroblock is made. The outputs of this check may include an indication of the result of the determination (which may be passed to the mode decision component as, or along with, intra-estimation results) and/or an indication of the result that may be used to disable full-pixel motion searching, as described herein.

As illustrated in this example, another operation that may be performed on data representing macroblock MB[n×1] in stage 1108 is a smart candidate estimation, which may in some embodiments be performed as a software operation by the mCPU (shown at 1114). In this operation, the predicted and co-located motion vectors may be used to generate several "smart" candidates, which may then be passed to the full-pixel predictive search in the next stage. In addition, a full exhaustive search may be performed on a scaled-down low resolution (e.g., 1/16th resolution) image, as shown at 1112, with data representing these candidates being passed to the full-pixel predictive search in the next stage.

In stage 1116 of the motion estimation method, which operates on data representing a previously received macroblock MB[n−2] while stage 1108 operates on data representing macroblock MB[n−1] and stage 1102 operates on data representing macroblock MB[n−1], a full-pixel predictive search may be performed on the full size pixels of the candidates received from the previous stage (shown at 1118). As noted above, this operation may be skipped, bypassed, disabled, or otherwise elided in the case that the results of the direct/skipped check previously performed for macroblock MB[n−2] indicates that the macroblock should be designated as a skip macroblock. This outputs of stage 1116 may include data representing the candidates that are passed to the subpixel refinement in the next stage. As illustrated in this example, subpixel refinement may be performed in a stage 1120, and may operate on data representing macroblock MB[n−3]. For example, subpixel refinement (shown at 1122) may include performing a search on half and/or quarter pixels using the candidates received from the previous stage(s), but this operation may be skipped, bypassed, disabled, or otherwise elided in the case that the result of the direct/skipped check previously performed for macroblock MB[n−3] indicates that the macroblock should be designated as a skip macroblock.

As noted above, a result of the mode decision made for a macroblock MB[n−4] in a stage 1124 may be input to the multi-stage motion estimation block as neighbor data when processing macroblock MB[n]. This is illustrated in FIG. 11 by the feedback from 1126 to stage 1102.

More specifically, in at least some embodiments, a direct/skipped check calculation, e.g., a sum of absolute differences (SAD) calculation, a sum of absolute transform differences (SATD) calculation, or a sum of squared differences (SSD) calculation between representations of the macroblock being processed and a predictor (or reference) macroblock, may be performed during the low resolution motion estimation stage (e.g., at 1110 in stage 1108). For example, a direct mode component may receive co-located motion vectors from memory (e.g., the DMA) and direct/skip motion vectors from the mode decision component, and may perform direct mode estimation. This may include computing the final motion vectors per sub-block (e.g., skip motion vectors, spatial direction motion vectors, or temporal direct motion vectors), performing weighted prediction, and computing a SAD, SATD, or SSD calculation between representations of the prediction macroblock and the input macroblock (e.g., the calculation may be applied to the difference block for the macroblock, which may be computed as the prediction macroblock minus the input macroblock). In some embodiments, an SATD metric may represent the sum of the absolute values of the 4×4 Hadamard transform coefficients for all of the 4×4 blocks in the current partition (e.g., a 16×16, 16×8, 8×16 or 8×8 partition). In at least some embodiments, in addition to these aggregate difference metrics, a metric representing the maximum individual pixel difference for the macroblock (or for a region or object of interest within the macroblock) may be computed (e.g., as part of direct mode/skipped mode check 1110 in stage 1108, or as part of another operation or stage) and this metric may be used in determining whether a macroblock should be designated as a skip macroblock instead of, or in addition to, the aggregate difference metrics.

The results of the aggregate and individual-pixel direct/skipped check calculations may be passed to the mode decision component. If the resulting direct/skipped check calculation value is below a pre-determined (programmable) threshold, the video encoder may designate the macroblock as a skip macroblock and may save power by bypassing the higher-resolution motion searches in the full-pixel motion estimation stage (e.g., at 1118 in stage 1116) and the subpixel motion estimation stage (e.g., at 1122 in stage 1120).

Intra Estimation

Referring again to FIG. 10, in at least some embodiments, an intra estimation component of the pipeline performs intra mode selection to determine blocks of pixels already encoded within the current frame that may be used in encoding a current macroblock. In at least some embodiments, the intra estimation component performs intra mode selection only for luma. In these embodiments, Chroma intra estimation is performed by a chroma reconstruction component at a downstream stage of the pipeline. In at least some embodiments, the intra estimation component may perform intra estimation independently for each of two or more blocks or partitions (e.g., 4×4, 8×8, 4×8, 8×4, 16×8, and/or 8×16 blocks) in a macroblock. For each block, prediction pixels are first extracted from neighbor blocks (neighbor blocks can be outside the current macroblock in the frame or within the current macroblock). For each prediction mode in the current block, the cost of the current mode is evaluated by creating a prediction block from neighbor pixels, computing a mode cost, and comparing the mode cost to a minimum cost for that block. Once all prediction modes are evaluated and the best mode is determined, reconstruction may be performed for the best mode so that reconstructed pixels can be used to predict future blocks within the macroblock. The intra estimation component may pass best intra mode information to mode decision 1020.

In at least some embodiments, macroblock input 1002 reads neighbor data from the bottom row of a previous quadrow from memory at quadrow boundaries and passes the neighbor data to the intra estimation component. In at least some embodiments, at least one downstream stage (e.g., a luma reconstruction component at a downstream stage) may pass neighbor data back to the intra estimation component.

Mode Decision

As noted above, if a macroblock is designated as a skip macroblock (e.g., as a result of calculations made during motion estimation or at another stage of a pipelined video encoding process), it may be represented in one or more subsequent video encoding stages by a macroblock predictor rather than by a motion component and a residual component. For example, a macroblock may typically be represented by data that specifies the motion component as motion vectors or motion vector differences and specifies the residual as the difference between the coefficients for the source macroblock and the predictive coefficients (e.g., the coefficients of a prediction macroblock), where the predictive coefficients are determined based on the motion vector, and the motion vector points to a portion of the previous (reference) frame to indicate what portion of the frame should be used as the prediction.

However, in at least some embodiments, a skip macroblock may be represented to a subsequent stage in the video encoding pipeline using a single bit (e.g., one indicating that it has been designated as a skip macroblock). For example, for a skip macroblock, once the motion vector predictor (e.g., a portion of the best candidate reference frame) has been determined, that portion of the reference frame may provide the prediction coefficients, and these prediction coefficients may be directly used to represent the macroblock. In such embodiments, the single bit that indicates that the macroblock has been designated as a skip macroblock directs downstream stages of the video encoder to paste whatever the motion estimation component determined was the best reference directly into the video frame to represent the macroblock.

One of the trade-offs to be made in video encoding is between the level of data compression and the best quality that can be achieved for that level of data compression. For example, a trade-off may be made between the level of quality that can be achieved when representing a macroblock using one bit (e.g., a bit that indicates that the macroblock has been designated as a skip macroblock) and any incremental increase in quality that can be achieved if significantly more bits are used to represent the macroblock (e.g., information representing a motion component and a residual component). Many video encoders include mechanisms to determine the best modes in which to code each macroblock and/or to determine when a macroblock should be coded as a skip macroblock. As previously noted, in some existing systems, a video encoder may take the current video frame, divide it into macroblocks, find the best predictor for each, compute an aggregate distortion metric (e.g., an SAD, SATD, or SSD metric), and compare the value of the aggregate distortion metric to a threshold value to determine whether or not to designate the macroblock as a skip macroblock.

However, these aggregate distortion metrics are relatively coarse and this approach can yield some (or many) "skip artifacts." For example, skip artifacts can arise when the value of the aggregate distortion metric is very low (e.g., well below the skip threshold value), but the macroblock may include a small number of pixels for which the difference between the input macroblock and the prediction macroblock is very large. In other words, when summing over the whole macroblock, the aggregate distortion metric may be small, but the differences in the few pixels for which the differences are large may easily be visible to the human eye. In at least some embodiments, instead of relying only on aggregate distortion metrics such as SAD, SATD, or SSD to determine whether or not to designate a macroblock as a skip macroblock, the video encoders described herein may also rely on the maximum difference between the input macroblock and the prediction macroblock for any individual pixel within the macroblock (or within a region or object of interest within the macroblock) to make this determination. In such embodiments, if the maximum difference is high (e.g., greater than a pre-determined, programmable skip threshold value for individual pixel differences), the macroblock may not be designated as a skip macroblock even if the aggregate distortion metric value is low (e.g., below its pre-determined, programmable skip threshold value). In other words, in some embodiments, the video encoders described herein may employ one skip threshold value for an aggregate distortion metric for the macroblock as a whole and another skip threshold value for individual pixel differences, both of which must be satisfied in order to designate a macroblock as a skip macroblock. In some ways, this approach may be thought of as an approach that attempts to minimize the maximum absolute difference between the pixels of the input macroblock and the prediction macroblock.

Referring again to FIG. 10, in at least some embodiments, mode decision 1020 may be implemented by a mode decision component at a stage of the pipeline that is downstream of the stage(s) that implement intra-frame and inter-frame estimation 1010 operations. However, in some embodiments, mode decision 1020 operations may be subdivided into two or more sub-operations that may be performed at one, two, or more stages of the pipeline, with one or more components or pipeline units at each stage configured to perform a particular sub-operation. In at least some embodiments, the mode decision 1020 component receives the best intra mode from intra estimation, direct/skip mode cost from direct mode estimation, and motion vector candidates from the motion estimation engines. In at least some embodiments, the mode decision component computes additional costs for bi-directional modes and determines the best macroblock type, including macroblock partitions, sub-partitions, prediction direction and reference frame indices. In at least some embodiments, the mode decision 1020 component also performs all motion vector prediction. The motion vector prediction results may be used when estimating motion vector rate during mode decision. In at least some embodiments, the motion vector prediction results may also be fed back from the mode decision 1020 component to motion estimation, for example for use in direct mode estimation and motion vector rate estimation.

In at least some embodiments, along with the best intra mode, the intra estimation component may report the aggregate distortion metrics (e.g., SAD, SATD or SSD) and rate for the best mode, and motion estimation may report partition candidates (e.g., one best candidate per partition size and sub-partition down to 4×4), per reference frame. In some embodiments, motion estimation may also report a skip/direct mode motion vector per 4×4 sub-partition, the aggregate distortion metric (e.g., SAD, SATD or SSD) per 8×8 partition, and the skip mode motion vector difference. The skip mode motion vector difference may used by downstream stages when and if an initial determination that the macroblock should be designated as a skip macroblock is reversed. In some embodiments, the mode decision component may compute the aggregate distortion metric (e.g., SAD, SATD or SSD), rate and/or cost for bi-directional prediction modes. For Bi-directional modes, the mode decision component may use the aggregate distortion metric results (e.g., SAD, SATD or SSD values) from motion estimation to determine the best bi-directional motion vectors. These motion vectors may then be used to fetch reference data from motion estimation memory, which returns subpixel interpolated results. The mode decision component may then perform weighted prediction, compute the aggregate distortion metric (e.g., SAD, SATD or SSD) against the input block for all bi-directional partitions, and compare bi-directional costs against other modes.

Figure 12:
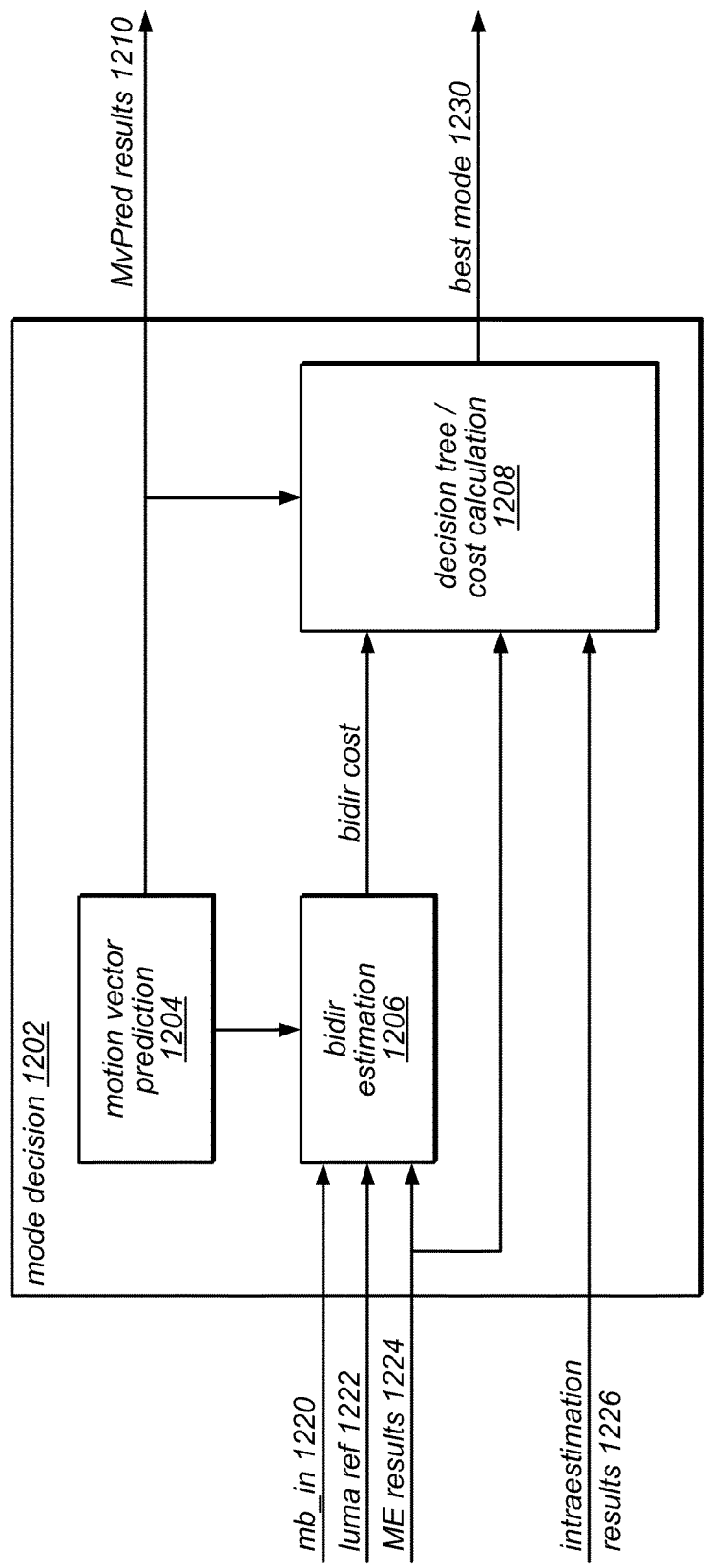
FIG. 12 is a block diagram illustrating a mode decision component of a video encoding apparatus, according to at least some embodiments.

One embodiment of a mode decision component of a video encoding apparatus is illustrated by the block diagram in FIG. 12. In this example, mode decision block 1202 includes motion vector prediction block (MVPred) 1204, bi-directional estimation block 1206 and mode decision tree 1208. In some embodiments, mode decision tree 1208 may perform cost calculations and may generate best mode decisions based on operations applied to the luma component of input macroblocks, indications of which are output as best mode 1230. As illustrated in this example, inputs to the mode decision process (and to mode decision block 1202) for a given mode decision may include a representation of an input macroblock (shown as mb_in 1220), and a luma reference 1222. Mode decision block 1202 also receives the best intra macroblock mode from intra estimation (illustrated in FIG. 12 as intraestimation results 1226), and direct/skip results and motion vector candidates from motion estimation (illustrated in FIG. 12 as ME results 1224).

In this example, MVPred 1204 computes the prediction motion vector for each mode that mode decision block 1202 is evaluating and also spatial direct and skip motion vectors. In the case of skip or direct mode, the predicted vector (shown as MvPred results 1210) may be passed to motion estimation, where it may be used as the motion vector to evaluate the cost of that mode (e.g., it may be used for direct mode estimation and motion vector rate estimation). This is illustrated in FIG. 11 as the feedback from mode decision 1126 to motion estimation stage 1102. For all other modes, MVPred 1204 may be used to determine the motion vector difference. For example, the predicted motion vector may be subtracted from the motion estimation motion vector to generate the motion vector difference (MVD). The motion vector difference may then be used to compute the number of bits required to transmit the motion vector, which may be added to the rate calculation for that partition. The motion vector difference may be passed to downstream blocks, and may be encoded in the bit stream at the CAVLC encoding stage.

In at least some embodiments, motion vector predictors may be derived from top and left neighboring motion vectors according to the neighbor block derivation process of the H.264 standard. On the top macroblock of a quadrow, top neighbor information may be obtained from neighbor data input. Information about left neighbors and top neighbors for rows 1-3 of a quadrow may be maintained by mode decision block 1202, and may include the macroblock type, the macroblock subtype (indexed by the macroblock partition index), the best references for the neighbor macroblock (indexed by the macroblock partition index), and the motion vectors for the neighbor macroblock (indexed by the macroblock sub-partition index and motion vector component, x or y).

In at least some embodiments, the best mode may be determined based on the lowest overall cost from among multiple available options. For example, for 16×16 modes, the best mode may be determined from among skip mode, direct mode, motion estimation results, and bi-directional mode buy comparing the costs of each mode according to the following cost function:

Cost=(SATD+md_lambda*rate+md_offset[mode])*md_scale[mode]

In this example, the SATD value is passed from motion estimation or bi-directional mode estimation, lamda_mb is a programmable scale factor (which may be programmed based on the current quantization parameter), rate is an approximation of the number of bits required to encode the current mode (e.g., all macroblock layer bits up to and excluding residual data), md_offset is a programmable offset per mode, and md_scale is a programmable scale factor per mode. In at least some embodiments, there is one lambda_mb value for all intra modes and a different lambda_mb value for all inter modes.

In at least some embodiments, for 16×8 or 8×16 partitions, the best mode may be determined from among the motion estimation results and the bi-directional motion estimation results, again based on the lowest overall cost. For these partitions, the mode decision may be performed in macroblock partition order, since the second partition motion vector predictor depends on the best mode of the first partition. The cost for each mode is computed per partition (e.g., using the same cost function as for 16×16 modes), and the cost of the two partitions may be summed to provide the final macroblock cost for each mode.

In at least some embodiments, for 8×8 partitions, the best mode may be determined between the motion estimation results, direct mode, and the bi-directional motion estimation results. Here again, the mode decision may be performed in macroblock partition order, since (for most modes) the second partition motion vector predictor depends on the best mode of the first partition. However, there may be an exception for any direct modes in which the motion vector prediction only depends on neighbor macroblocks. For such modes, the cost for all of the partitions may not need to be computed in partition order. In at least some embodiments, the cost for each mode may be computed per partition (e.g., using the same cost function as for 16×16 modes). Note that the lowest cost for the modes resulting from motion estimation provide a best motion estimation 8×8 partition and sub-partition. When computing the cost for sub-partitions (e.g., 8×4, 4×8 and 4×4 sub-partitions), the cost may be computed in sub-partition order to determine the correct motion vector prediction. The best 8×8, 8×4, 4×8 or 4×4 sub-type from motion estimation may then be compared to the direct mode and bi-directional motion estimation result costs to determine the best overall mode per partition. The cost of the four 8×8 partitions may then be summed to provide the final macroblock cost for each mode.

In at least some embodiments, the final mode decision may be determined by finding the lowest cost results between the best results for intra estimation and different partition types using the decision order listed below.
1. Lowest cost
2. Least number of bits to encode the macroblock type and sub-macroblock type
3. Lowest motion estimation index value For example, when two or more modes have the same cost, mode decision block 1202 may choose the mode with the lowest type encoded index as defined in the H.264 standard. Note that the skip mode requires the fewest number of bits to encode and may be chosen over all other types when there is no difference in cost. When both the cost and type are the same for two or more modes, the candidate with the lowest motion estimation index value may be selected.

As noted above, in at least some embodiments, the video encoders described herein may be configured to designate a macroblock as a skip macroblock only if the aggregate distortion metric (e.g., SAD, SATD or SSD) computed for the block indicates that the cost of designating the macroblock as a skip macroblock is less than the cost of encoding the macroblock (e.g., using a motion vector component and a residual component) and if the absolute difference between each pixel and the corresponding pixel in its reference is larger than a pre-determined skip threshold. In some embodiments, this approach may lead to less visual distortion than approaches in which only aggregate distortion metrics are used to determine whether a macroblock should be designated as a skip macro.

Figure 13:
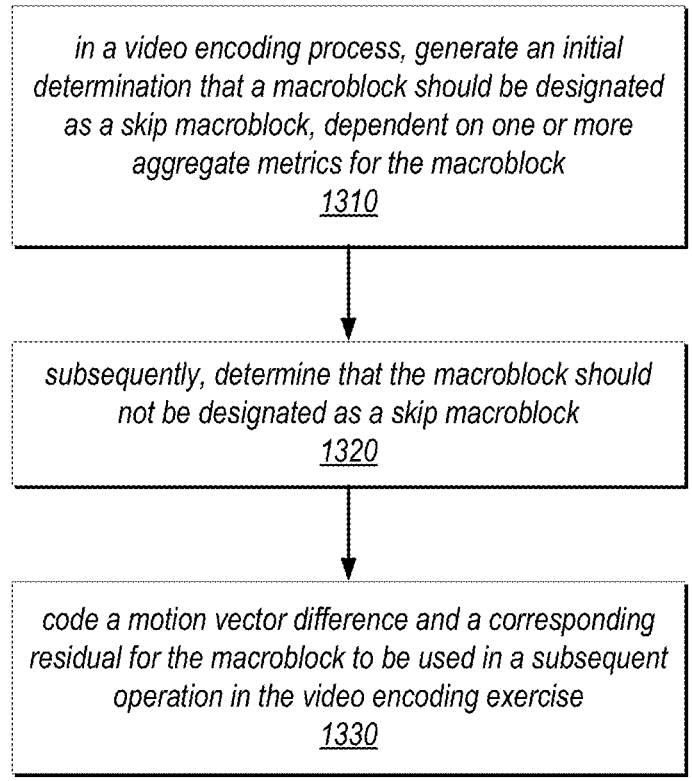
FIG. 13 is a flow diagram illustrating a portion of a method for performing video encoding, according to at least some embodiments.

One embodiment of a method for performing video encoding is illustrated by the flow diagram in FIG. 13. As illustrated at 1310, in this example, a video encoding process may include generating an initial determination that a macroblock should be designated as a skip macroblock, dependent on one or more aggregate metrics for the macroblock. For example, in some embodiments, the initial determination may be made in a video encoding stage that operates on a representation of a luma component of the macroblock, and may be dependent on one or more aggregate metrics for the macroblock (e.g., SAD, SATD or SSD metrics) that are computed for the luma component of the macroblock.

As illustrated in this example, the method may include (subsequent to determining that the macroblock should be designated as a skip macroblock) determining that the macroblock should not be designated as a skip macroblock, as in 1320. For example, in various embodiments, the initial determination may be overridden or reversed based on additional information or computations made within the same stage or in a subsequent stage in the video encoding process.

As illustrated in FIG. 13, in response to determining that the macroblock should not be designated as a skip macroblock after all, the method may include coding a motion vector component (e.g., a motion vector difference) and a corresponding residual component for the macroblock to be used in at least one subsequent operation within the video encoding process, as in 1330.

In some embodiments, the video encoders described herein may make a determination of whether (or not) to designate a macroblock as a skip macroblock based, at least in part, on the maximum absolute difference between any pixel in a particular cluster of pixels and the corresponding pixel in its reference (e.g., based on whether the maximum difference between pixels in the current frame and those in its best predictor is larger than a pre-determined skip threshold), rather than on whether the maximum absolute difference between any pixel in the macroblock and the corresponding pixel in the reference exceeds a pre-determined individual pixel skip threshold. As previously noted, in some embodiments, taking into consideration individual pixel difference metrics when determining whether or not to designate a macroblock as a skip macroblock may lead to fewer skip artifacts. For example, in some such embodiments, a particular cluster of pixels within the macroblock may be marked (or otherwise explicitly identified) by a user as being a region of interest or as representing an object of interest within the video frame, and if the difference between any of the pixels within this cluster of pixels and their corresponding pixels in the reference exceeds the skip threshold, the video encoder may be configured to determine that the macroblock should not be designated as a skip macroblock (or that an initial determination that the macroblock should be designated as a skip macroblock should be overridden or reversed, i.e., to "escape out" of the skip).

In another example, if a particular cluster of pixels has been determined to represent a face (e.g., by an automated face detection mechanism) or a particular object of interest (e.g., by an automated object detection mechanism), each of the individual pixels of the particular cluster may be compared with the corresponding pixels in the reference to determine whether the maximum individual difference for any of the pixels in the cluster exceeds a pre-determined individual pixel skip threshold and/or to determine whether the individual difference for at least a pre-defined number of pixels of the particular cluster exceeds a pre-determined individual pixel skip threshold. If so, the video encoder may be configured to determine that the macroblock should not be designated as a skip macroblock (or that an initial determination that the macroblock should be designated as a skip macroblock should be overridden or reversed, i.e., to escape out of the skip). For example, in some embodiments, the video encoders described herein may include (e.g., within the motion estimation stage or another early stage) mechanisms to generate statistics that detect faces or other interesting features (of the image content) for which it would be desirable to reduce skip artifacts.

In some embodiments, an individual pixel skip threshold may be customized for the content (e.g., for different clusters of "special" pixels). For example, there may be one individual pixel skip threshold for clusters of pixels that have been determined to represent a face (e.g., a relatively low threshold value), and a different (e.g., higher) individual pixel skip threshold for clusters of pixels that have been determined to represent another feature or region of interest within the macroblock. In some embodiments, the individual pixel skip threshold may be set to a relatively high value for pixels within a particularly uninteresting region of the macro (e.g., for the pixels across the top of a video frame that represent the sky) so that even large differences between these pixels and the corresponding pixels in the reference do not override a determination (e.g., one based on aggregate distortion metrics) that the macroblock should be designated as a skip macroblock.

Figure 14:
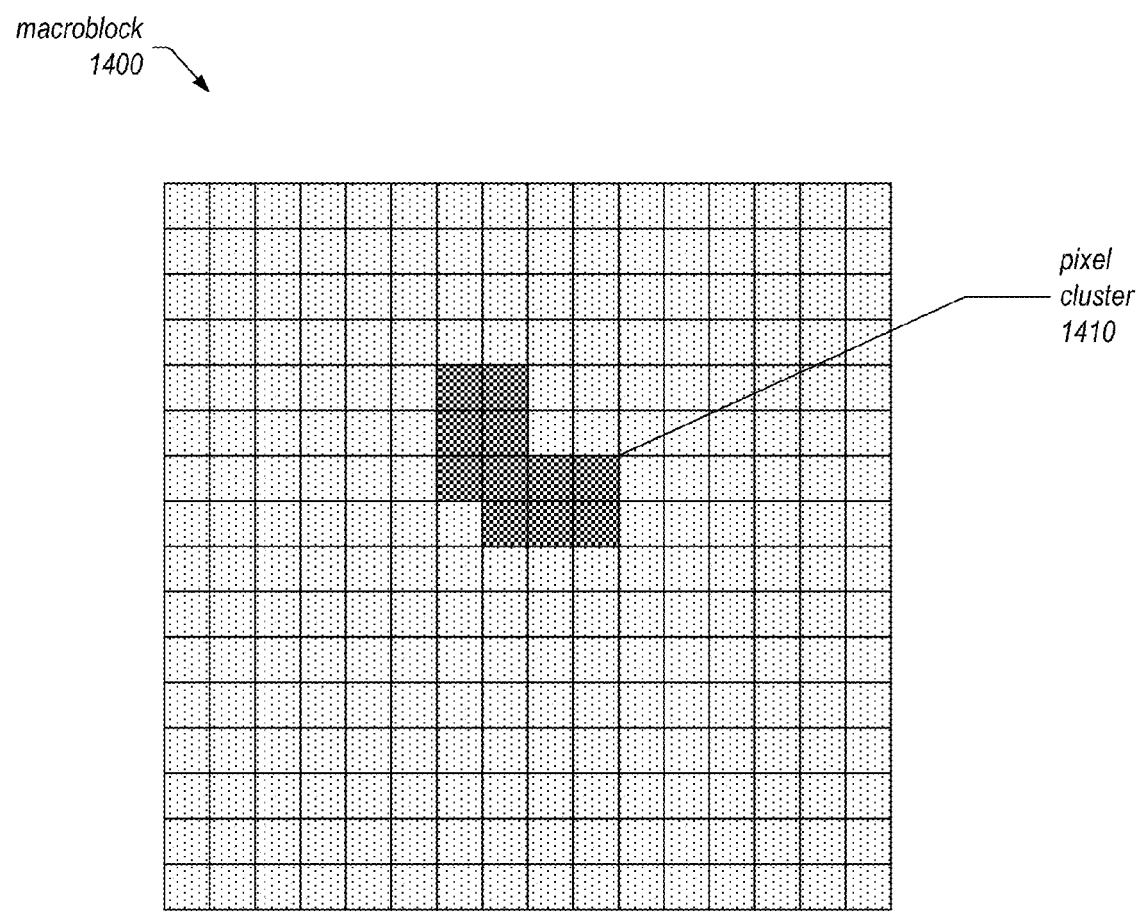
FIG. 14 illustrates the designation of a pixel cluster of interest in a macroblock to be processed in a video encoding operation, according to at least some embodiments.

FIG. 14 is a block diagram illustrating the designation of a pixel cluster of interest in a macroblock to be processed in a video encoding operation, according to at least some embodiments. In this example, pixel cluster 1410 within macroblock 1400 has been identified (e.g., automatically or explicitly) as a pixel cluster of interest. If the difference between a representation of one of the pixels within pixel cluster 1410 and the corresponding representation of that pixel for the reference exceeds the value of a programmable skip threshold for that pixel cluster, macroblock 1400 will not be encoded as a skip macroblock, regardless of whether an aggregate distortion metric for macroblock 1400 exceeds the value of a programmable skip threshold for the macroblock as a whole. As an example, in FIG. 1, the user may specify a group of pixels in a macroblock, such that if the difference between a representation of a pixel in the macroblock and in the corresponding pixel in the reference for one or more of the pixels in the group (e.g., for at least a pre-defined number of pixels in the group) is larger than a programmable threshold, then the macroblock is not encoded as a skip macroblock.

Motion Compensation and Reconstruction

Referring again to FIG. 10, in at least some embodiments, motion compensation and reconstruction 1030 operations may be subdivided into two or more sub-operations that may be performed at one, two, or more stages of the pipeline, with one or more components or pipeline units at each stage configured to perform a particular sub-operation. For example, in some embodiments, motion compensation and reconstruction 1030 may be subdivided into luma motion compensation and reconstruction and chroma motion compensation and reconstruction. In at least some embodiments, each of these sub-operations of motion compensation and reconstruction 1030 may be performed by one or more components or pipeline units at one or more stages of the pipeline.

Luma Motion Compensation and Reconstruction

In at least some embodiments, a luma motion compensation component of the pipeline receives the best mode and corresponding motion vectors from mode decision 1020. As previously noted, each motion estimation engine may include a memory component that reads and stores reference frame data from a memory. If the best mode is inter-predicted, the luma motion compensation component requests reference frame macroblocks from the motion estimation engine corresponding to the motion vectors. The motion estimation engine returns subpixel interpolated 4×4 or 8×8 blocks depending on the request size. The luma motion compensation component then combines the blocks into prediction macroblocks. The luma motion compensation component then applies a weighted prediction to the prediction macroblocks to create the final macroblock predictor that is then passed to the luma reconstruction component.

In at least some embodiments, a luma reconstruction component of the pipeline performs macroblock reconstruction for luma, including intra prediction (in at least some embodiments, the luma motion compensation component performs inter prediction), forward transform and quantization (FTQ), and inverse transform and quantization (ITQ).

In at least some embodiments, based on the best mode from mode decision 1020, either an inter prediction macroblock is passed from the luma motion compensation component or intra prediction is performed by the luma reconstruction component to generate a prediction block. In intra mode, the prediction is performed in block (scan) order since reconstructed pixels from neighbor blocks are needed for prediction of future blocks. The input block is subtracted from the prediction block to generate a residual block. This residual pixel data is transformed and quantized by an FTQ technique implemented by the luma reconstruction component (or an FTQ block thereof). The coefficient data is sent to an ITQ technique implemented by the luma reconstruction component (or an ITQ block thereof), and may also be sent downstream to CAVLC encoding. The ITQ technique generates a reconstructed residual pixel block. The prediction block is added to the residual block to generate the reconstructed block. Reconstructed pixels may be passed downstream to a deblocking filter. In at least some embodiments, reconstructed pixels may also be passed back to an intra-frame estimation component of intra-frame and inter-frame estimation 1010 for prediction of future blocks inside the current macroblock.

In at least some embodiments, coefficient cancellation may be performed during quantization. For example, if a given block (e.g., a 4×4 or 8×8 block within a macroblock) contains only values of −1 or +1, the luma coefficients for the entire block may be forced to all zeros. In some embodiments, a cost matrix may contain the cost of a +/−1 quantized level at a given position in the block. For all +/−1 quantized level, the cost is looked up in the table based on the position. If the sum of the costs over the block is below a programmable threshold, all quantized coefficients in the block may be forced to zero. In some embodiments, separate thresholds may be provided for intra modes, inter modes, and skip/direct modes. This approach may, in some embodiments, allow the video encoder to reduce the bit rate for sparse coefficients when encoding at very low bit rate.

In at least some embodiments, the video encoders described herein may be configured to handle potential skip macroblocks in two different ways, e.g., using two different types of skip modes, under different circumstances. These two skip mode types may be referred to as "normal" skip mode and "natural" skip mode. Normal skip mode may imply that no quantized coefficients are transmitted. For example, if the video encoder treats the macroblock as a skip macroblock in normal skip mode (e.g., if the encoder determines that the best mode is a normal skip mode), all of the quantized luma coefficients for the macroblock may be forced to zero. This approach can sometimes cause encoding artifacts when the prediction macroblock has a few pixels with large differences from the input macroblock, e.g., in embodiments in which only aggregate distortion metrics for the luma (intensity) component of the macroblock were used to determine that the macroblock should be designated as a skip macroblock. For example, these artifacts may appear as trailing or ghosting pixels around moving objects. To alleviate these artifacts, the encoder may choose to use the natural skip mode for the skip macroblock.

In natural skip mode, transform and quantization may be performed on the macroblock residual pixel data, using the coefficient cancellation threshold of the skip/direct mode. In this case, the CAVLC encoding stage will encode the macroblock as a skip macroblock only if both the quantized luma coefficients and the quantized chroma coefficients are zero. In this example, the luma reconstruction component will set quantized luma coefficients according to the results of the quantization, and a macroblock will be encoded in skip mode by the CAVLC encoding stage only if:

1. The best mode is determined to be skip mode, and normal skip is used in luma reconstruction and in chroma reconstruction, or
2. The best mode is determined to be skip mode, natural skip is used, and the quantized luma coefficients and the quantized chroma coefficients are zero after luma reconstruction and chroma reconstruction.

In other words, in natural skip mode, when skip mode is determined to be the best mode for a given macroblock (e.g., by the mode decision process), transform and quantization are performed on residual data. However, the macroblock is actually coded in skip mode only if no residual data is present. Otherwise the mode is changed, and the correct motion vector difference is used. Note that this approach may be applied independently to the luma component and the chroma components of a potential skip macroblock.

Chroma Motion Compensation and Reconstruction

In at least some embodiments, chroma reconstruction is performed in two stages. In the first stage, chroma reference blocks needed for inter prediction are read from memory based on input macroblock type, motion vectors, and reference frame index. Subpixel interpolation and weighted prediction is then applied to generate a prediction macroblock. In the second stage, chroma intra prediction and chroma intra/inter FTQ/ITQ is performed. This allows one additional pipeline stage to load chroma prediction pixel data. Since chroma pixels are not searched by motion estimation, the chroma prediction data is read from external memory and may have large latency. In at least some embodiments, a chroma motion compensation component performs the first stage, while a chroma reconstruction component performs the second stage.

In at least some embodiments, the chroma motion compensation component generates a prediction block including subpixel interpolation for Cb and Cr chroma blocks; the size is based on the partition size and chroma formats. A full size chroma block is 8×8, 8×16, or 16×16 pixels for chroma formats 4:2:0, 4:2:2 and 4:4:4, respectively. In at least some embodiments, the chroma motion compensation component may prefetch and cache chroma prediction pixels from an external (to the pipeline) memory. Referring again to FIG. 10, in at least some embodiments, reference data may be read based on mode decision 1020 results. The chroma motion compensation component performs subpixel interpolation to generate a prediction block. Mode decision 1020 provides the macroblock type and sub-types, reference frame index per partition, and corresponding motion vectors. The prediction is output to the chroma reconstruction component.

In at least some embodiments, the chroma reconstruction component performs chroma prediction, chroma intra estimation and chroma reconstruction for inter and intra modes. For chroma formats 4:2:0 and 4:2:2, intra chroma estimation and prediction is performed. In at least some embodiments, chroma intra estimation is performed at this stage rather than at intra-frame and inter-frame estimation 1010 so that reconstructed pixels can be used during the estimation process. In at least some embodiments, if the best mode is an intra mode, intra chroma estimation may be performed based on the best intra chroma mode, and intra prediction may be performed using one of four intra chroma modes. For inter macroblocks, inter chroma prediction pixels are received from chroma motion compensation. For chroma format 4:4:4, the luma intra prediction modes are used to generate the chroma block prediction, and inter chroma prediction is performed in the same manner as for luma. Therefore, chroma reconstruction conceptually includes 4:2:0 and 4:2:2 chroma reconstruction and luma reconstruction used to reconstruct chroma in 4:4:4 chroma format.

In at least some embodiments, coefficient cancellation may be performed on chroma coefficients during quantization in a manner similar to that described above for performing luma coefficient cancellation. For example, if a given block (e.g., a 4×4 or 8×8 block within a macroblock) contains only values of −1 or +1, the chroma coefficients for the entire block may be forced to all zeros. In some embodiments, a cost matrix may contain the cost of a +/−1 quantized level at a given position in the block. For all +/−1 quantized level, the cost is looked up in the table based on the position. If the sum of the costs over the block is below a programmable threshold, all quantized coefficients in the block may be forced to zero. In some embodiments, separate thresholds may be provided for intra modes, inter modes, and skip/direct modes. This approach may, in some embodiments, allow the video encoder to reduce the bit rate for sparse coefficients when encoding at very low bit rate.

As noted above, the video encoders described herein may be configured to handle potential skip macroblocks in two different ways, e.g., using two different types of skip modes, under different circumstances. These two skip mode types may be referred to as "normal" skip mode and "natural" skip mode. Normal skip mode may imply that no quantized coefficients are transmitted. For example, if the video encoder treats the macroblock as a skip macroblock in normal skip mode (e.g., if the encoder determines that the best mode is a normal skip mode), all of the quantized chroma coefficients for the macroblock may be forced to zero. This approach can sometimes cause encoding artifacts when the prediction macroblock has a few pixels with large differences from the input macroblock. For example, these artifacts may appear as trailing or ghosting pixels around moving objects. This may be especially true for chroma data in embodiments in which chroma data was not used during the mode decision to generate an initial determination that the macroblock should be designated as a skip macroblock, e.g., in embodiments in which only aggregate distortion metrics for the luma (intensity) component of the macroblock were used to determine that the macroblock should be designated as a skip macroblock. To alleviate these artifacts, the encoder may choose to use the natural skip mode for the skip macroblock.

As noted above, in natural skip mode, transform and quantization may be performed on the macroblock residual pixel data, using the coefficient cancellation threshold of the skip/direct mode. In this case, the CAVLC encoding stage will encode the macroblock as a skip macroblock only if both the quantized luma coefficients and the quantized chroma coefficients are zero. In this example, the luma reconstruction component will set quantized luma coefficients according to the results of the quantization, and a macroblock will be encoded in skip mode by the CAVLC encoding stage only if:
1. The best mode is determined to be skip mode, and normal skip is used in luma reconstruction and in chroma reconstruction, or
2. The best mode is determined to be skip mode, natural skip is used, and the quantized luma coefficients and the quantized chroma coefficients are zero after luma reconstruction and chroma reconstruction.

In other words, in natural skip mode, when skip mode is determined to be the best mode for a given macroblock (e.g., by the mode decision process), transform and quantization are performed on residual data. However, the macroblock is actually coded in skip mode only if no residual data is present. Otherwise the mode is changed, and the correct motion vector difference is used. Note that this approach may be applied independently to the luma component and the chroma components of a potential skip macroblock.

Note that in some embodiments, the skip mode may be different for luma reconstruction than for chroma reconstruction. For example, the encoder may choose to use the mode decision results for skip mode for the luma data (and use normal skip mode for luma reconstruction), but may choose to be more conservative for the chroma data (and use natural skip mode for chroma reconstruction). In this case, the macroblock may be encoded using motion vector differences passed from the chroma reconstruction if at least some of the quantized chroma coefficients are non-zero.

As described herein, in at least some embodiments, an initial determination of whether (or not) to designate a macroblock as a skip macroblock may be performed as part of the estimation. In other words, it is often the case that this is the stage in which the best reference is found and in which various distortion metrics (e.g., SAD, SATD, or SSD values) are computed. In some existing systems, these metrics are computed based on data for the luma component of the macroblock (which is the intensity component), and not for the chroma component(s). However, in some applications (e.g., for cartoons and similar types of video content) there may be a reference frame that is really good match for the input macroblock in the intensity (leading the macroblock to be designated as a skip macroblock), but the color (chroma components) might be completely different. In this situation, video encoders that do not take the chroma data into account when determining whether (or not) to designate a macroblock as a skip macroblock may select a reference that is a different color than the input macroblock. This type of artifact would clearly be undesirable.

In some embodiments of the video encoders described herein, after an initial determination that a macroblock should be designated as a skip macroblock based on aggregate and/or individual pixel distortion metrics that were computed for the luma component (e.g., in an early stage of the video encoding process), a subsequent stage in the video encoding process (e.g., chroma reconstruction stage) may receive the resulting skip motion vector and calculate various aggregate and/or individual pixel distortion metrics for the chroma component(s) based on that skip motion vector. If the chroma metrics indicate that the differences between the reference and the input macroblock are too large (e.g., if the maximum error exceeds a pre-determined individual pixel skip threshold value), the initial determination that the macroblock should be designated as a skip macroblock may be reversed.

CAVLC Encode and Deblocking

Referring again to FIG. 10, in at least some embodiments, CAVLC encoding and deblocking may be performed by one or more components at a last stage of the pipeline. In at least some embodiments, a deblocking filter component of the pipeline receives reconstructed luma and chroma pixels from the chroma reconstruction component and performs deblocking filtering according to the H.264 Recommendation. Results may be output to a memory.

In at least some embodiments, a CAVLC encode component of the pipeline receives at least luma and chroma quantized coefficients, neighbor data, and chroma reconstruction results from the chroma reconstruction component and generates a CAVLC (context-adaptive variable-length coding) encoded output stream to a memory.

In at least some embodiments, the deblocking filter component and the CAVLC encode component write neighbor data for the bottom row of a quadrow to a memory at quadrow boundaries. Referring again to FIG. 10, for the top row of a next quadrow, macroblock input 1002 may then read this neighbor data from the memory at quadrow boundaries and pass the neighbor data to at least one downstream stage of the pipeline. In at least some embodiments, if a macroblock is the last macroblock on a row, it cannot be encoded as skipped in CAVLC mode. In such embodiments, if a macroblock that was previously designated as a skip macroblock (e.g., in an earlier stage of a pipelined video encoding process) is determined to be the last macroblock on its row (e.g., at the CAVLC encoding stage), the video encoder (e.g., the video encoder hardware) may be configured to automatically change the macroblock to a non-skip macroblock. Note that this restriction may not apply to CABAC encoding.

Transcoder

In at least some embodiments, a transcoding operation may be performed by a transcoder 1050. The transcoder may be implemented as a functional component of the pipeline or as a functional component that is external to the pipeline. In at least some embodiments, the transcoder 1050 may perform a memory-to-memory conversion of a CAVLC (context-adaptive variable-length coding) encoded stream output by the pipeline to a CABAC (context-adaptive binary arithmetic coding) encoded stream.

In at least some embodiments, the pipeline may encode in an order other than scan order, for example knight's order as previously described herein. However, ultimately, the H.264 video encoder's encoded bit stream should be transmitted in conventional macroblock scan order. In at least some embodiments, re-ordering the macroblock output from knight's order to scan order is accomplished by the CAVLC encode component writing encoded data to four different output buffers, each output buffer corresponding to a macroblock row. At the end of a quadrow, each row buffer will contain a scan order stream of encoded macroblocks for a respective row. Transcoder 1050 handles stitching the start and end of each row to generate a continuous stream at macroblock row boundaries. In at least some embodiments, the pipeline may embed metadata in the CAVLC output stream to facilitate stitching of the rows by the transcoder 1050.

In at least some embodiments, most of the representations of macroblocks that are generated in upstream blocks are encoded as is (e.g., without first being modified) in the CAVLC encoding stage. However, some syntax elements of various macroblock representations may be generated or modified by the CAVLC encoding stage, e.g., in circumstances that require special handling. For example, in some embodiments, the last macroblock at the end of a macroblock row cannot be encoded as a skip macroblock. This is because the next macroblock in scan order has already encoded (due to the knight's encoding order). Therefore, if the last macroblock of a row has been designated as a skip macroblock, the CAVLC encoding stage may be configured to encode it as a non-skipped macroblock. For example, in some embodiments, the input data (motion vector differences and reference indices) required to encode the block as a non-skipped macroblock may be passed to the CAVLC encoding stage (e.g., from the chroma reconstruction stage) even when the macroblock has been designated as a skip macroblock by an upstream stage. Therefore the CAVLC encoding stage may be able to change the mode and encode these syntax elements for the macroblock. In some embodiments, the encoding of a skip macroblock may include an element that specifies the number of consecutive skipped macroblocks (in macroblock scan order) for which the macroblock type should be inferred to be a skip macroblock type. In some embodiments, the CAVLC encoding stage may be configured to keep track of four such values that correspond to four macroblock rows.

As previously noted, in some embodiments, the CAVLC encoding stage may encode a macroblock as a skip macroblock if the best mode is determined to be skip mode, and normal skip is used in luma reconstruction and in chroma reconstruction; or if the best mode is determined to be skip mode, natural skip is used, and the quantized luma coefficients and the quantized chroma coefficients are zero after luma reconstruction and chroma reconstruction.

Figure 15:
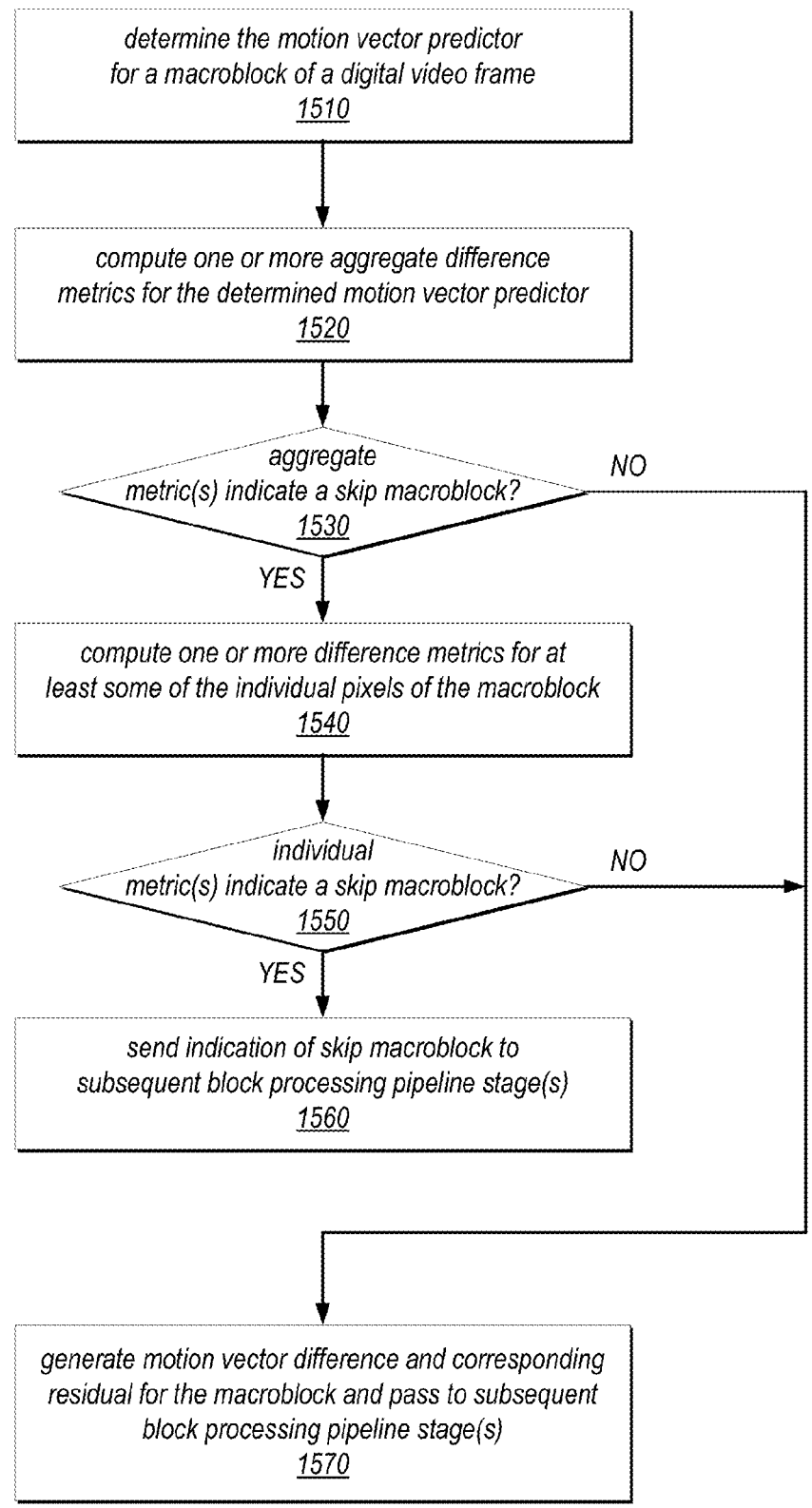
FIG. 15 is a flow diagram illustrating a method for making a skip mode decision for a macroblock in a video encoding operation, according to at least some embodiments.

One embodiment of a method for making a skip mode decision for a macroblock in a video encoding operation is illustrated by the flow diagram in FIG. 15. As illustrated at 1510, in this example, the method may include determining the motion vector predictor for a macroblock of a digital video frame. The method may also include computing one or more aggregate difference metrics for the determined motion vector predictor, as in 1520. For example, the method may include computing the value of an SAD, SATD, or SSD metric for the macroblock and the corresponding motion vector predictor, in different embodiments.

As illustrated in this example, if the aggregate metric(s) indicate that the macroblock should not be designated as a skip macroblock (shown as the negative exit from 1530), the method may include generating a motion vector difference and corresponding residual for the macroblock and passing them to one or more subsequent block processing pipeline stages, as in 1570. For example, data representing the motion vector difference and residual may be passed to the motion compensation and reconstruction component(s) of the video encoding operation for further processing. If, however, the aggregate metric(s) indicate that the macroblock should be designated as a skip macroblock (shown as the positive exit from 1530), the method may include computing one or more difference metrics for at least some of the individual pixels of the macroblock, as in 1540. For example, the method may include computing the maximum difference between any individual pixel in the macroblock (or in a cluster of pixels that represent an area or object of interest) and the corresponding pixel in the prediction macroblock (or the corresponding cluster of pixels within the prediction macroblock), and determining whether the maximum difference exceeds a pre-determined individual pixel skip threshold value.

As illustrated in this example, if the individual metric(s) indicate that the macroblock should not be designated as a skip macroblock (shown as the negative exit from 1550), the method may include generating a motion vector difference and corresponding residual for the macroblock and passing them to a subsequent block processing pipeline stage(s), as in 1570. For example, data representing the motion vector difference and residual may be passed to the motion compensation and reconstruction component(s) of the video encoding operation for further processing. If, however, the individual metric(s) indicate that the macroblock should be designated as a skip macroblock (shown as the positive exit from 1550), the method may include sending an indication that the macroblock has been designated as a skip macroblock to one or more subsequent block processing pipeline stages, as in 1560. For example, such an indication may be passed to the motion compensation and reconstruction component(s) of the video encoding operation and/or to the transcoding component of the video encoding operation, in various embodiments.

As previously noted, in some embodiments, the video encoders described herein may make preliminary determinations about whether to designate macroblocks as skip macroblocks based on various calculations that target data representing the luma components of those macroblocks, but may escape out of the skip mode based on one or more calculations that target data representing the chroma components of those macroblocks (e.g., if aggregate distortion metrics or maximum individual pixel differences for the chroma components are too large). In some such embodiments, the video encoders may be configured to pass enough information from the stages in which the luma calculations are generated (and/or in which the initial mode decisions are made based on the luma calculations) to subsequent stages (e.g., stages in which the chroma calculations are generated and/or in which the initial mode decisions are reevaluated based on the chroma calculations) to be able to escape out of the skip mode and code the motion vector differences and residuals for any macroblocks for which an initial skip mode decision is reversed.

Figure 16:
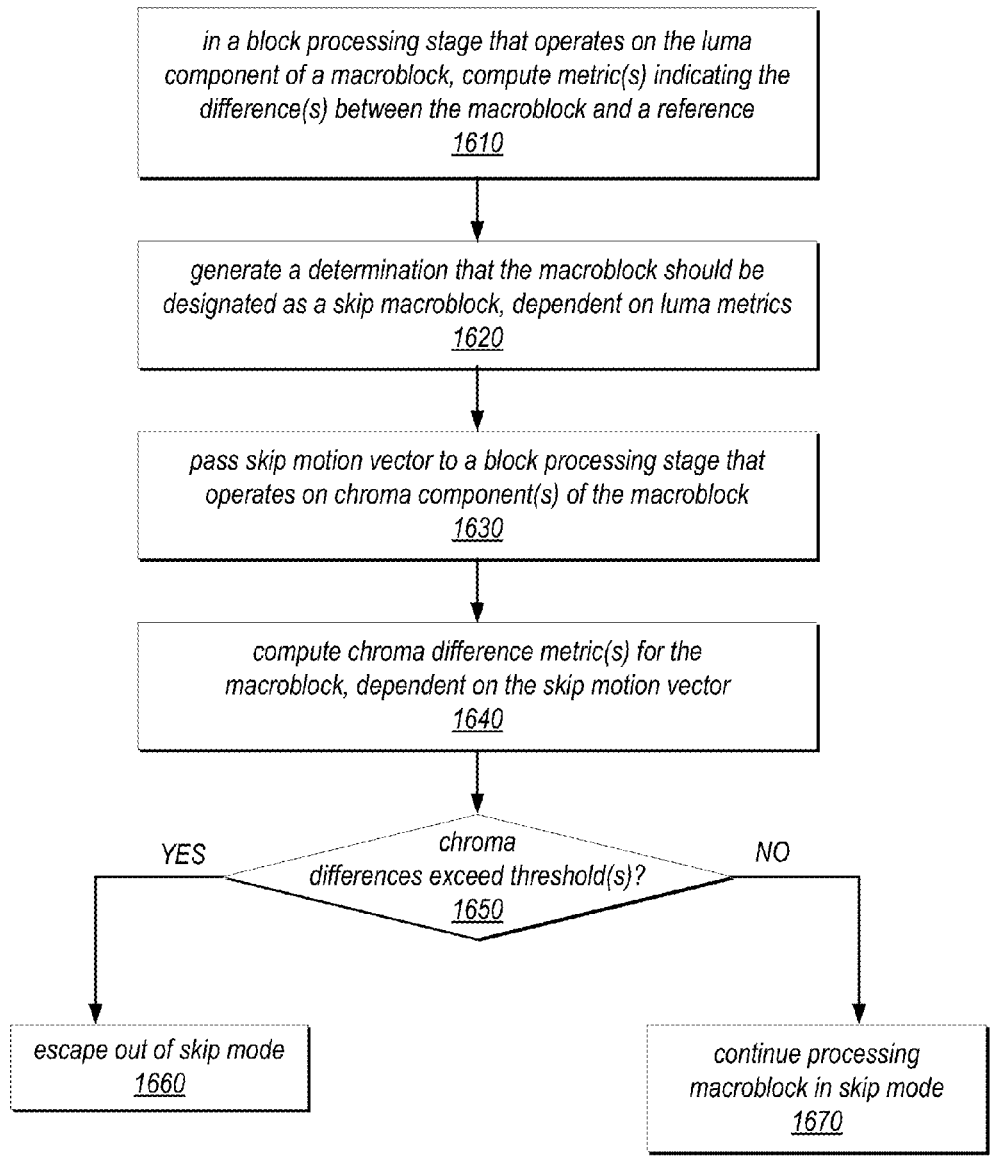
FIG. 16 is a flow diagram illustrating a method for processing a macroblock of a video frame, according to at least some embodiments.

One embodiment of a method for processing a macroblock of a video frame is illustrated by the flow diagram in FIG. 16. As illustrated at 1610, in this example, the method may include computing, in a block processing stage that operates on the luma component of a macroblock, one or more metric(s) indicating the difference(s) between the macroblock and a reference macroblock. For example, the computed metrics may include one or more aggregate distortion metrics and/or individual pixel difference metrics for the luma component of the macroblock, as described herein. As illustrated in FIG. 16, the method may include generating a determination that the macroblock should be designated as a skip macroblock, dependent on these luma metrics (as in 1620), and passing a skip motion vector to a block processing stage that operates on chroma component(s) of the macroblock (as in 1630).

As illustrated in this example, the method may include computing one or more chroma difference metric(s) for the macroblock, dependent on the skip motion vector, as in 1640. If none of the chroma differences exceeds a corresponding pre-determined threshold (shown as the negative exit from 1650), the method may include continuing to process the macroblock in skip mode, as in 1670. However, if one or more of the chroma differences exceeds the corresponding pre-determined threshold (shown as the positive exit from 1650), the method may include escaping out of the skip mode, as in 1660. For example, this may include generating a motion vector difference and corresponding residual for the macroblock and passing them to subsequent block processing pipeline stage(s).

Note that while FIG. 16 illustrates an example in which the chroma computations are made in a video encoding process stage that succeeds the stage in which the luma computations are performed (i.e., these computations are performed in different stages in sequential order), in other embodiments, the chroma computations and the luma computations may be performed in the same stage. For example, they may be performed substantially in parallel by the same component of the video encoder (during a single stage) or by different components of the video encoder.

Example Video Encoder Apparatus

FIG. 17 is a block diagram of an example video encoder apparatus 1700, according to at least some embodiments. The video encoder apparatus 1700 may, for example, be implemented as an integrated circuit (IC) or as a subsystem on an IC such as a system-on-a-chip (SOC). In at least some embodiments, the video encoder apparatus 1700 may include a pipeline 1740 component, a processor 1710 component (e.g., a low-power multicore processor), a memory management unit (MMU) 1720, DMA 1730, and an interconnect 1750 such as a bus subsystem or fabric that interconnects the functional components of the apparatus. The processor 1710 component of the video encoder apparatus 1700 may, for example, perform frame-level control of the pipeline 1740 such as rate control, perform pipeline 1740 configuration including configuration of individual pipeline units within the pipeline 1740, and interface with application software via a driver, for example for video encoder 1700 configuration. The MMU 1720 may serve as an interface to external memory, for example for streaming video input and/or output. Pipeline 1740 component may access memory through MMU 1720 via DMA 1730. In some embodiments, the video encoder apparatus 1700 may include other functional components or units not shown in FIG. 17, or fewer functional components than those shown in FIG. 17. An example block processing method that may be implemented by pipeline 1740 component is shown in FIG. 10. An example a system-on-a-chip (SOC) that may include at least one video encoder apparatus 1700 is illustrated in FIG. 18.

Example System on a Chip (SOC)

Turning now to FIG. 18, a block diagram of one embodiment of a system-on-a-chip (SOC) 1800 that may include at least one instance of a video encoder apparatus including a block processing pipeline that may implement one or more of the block processing methods and apparatus as illustrated in FIGS. 3 through 17. SOC 1800 is shown coupled to a memory 1850. As implied by the name, the components of the SOC 1800 may be integrated onto a single semiconductor substrate as an integrated circuit "chip." In some embodiments, the components may be implemented on two or more discrete chips in a system. However, the SOC 1800 will be used as an example herein. In the illustrated embodiment, the components of the SOC 1800 include a central processing unit (CPU) complex 1820, on-chip peripheral components 1840A-1840B (more briefly, "peripherals"), a memory controller (MC) 1830, a video encoder 1700 (which may itself be considered a peripheral component), and a communication fabric 1810. The components 1820, 1830, 1840A-1840B, and 1700 may all be coupled to the communication fabric 1810. The memory controller 1830 may be coupled to the memory 1850 during use, and the peripheral 1840B may be coupled to an external interface 1860 during use. In the illustrated embodiment, the CPU complex 1820 includes one or more processors (P) 1824 and a level two (L2) cache 1822. In some embodiments, the CPU complex may be configured to cache neighbor data, which may include source transform coefficients (e.g., DC transform coefficients), modified transform coefficients, previously computed quantization errors, and/or weighting coefficient values for one or more neighbor pixels, among other information used in the video encoding operations described herein.

The peripherals 1840A-1840B may be any set of additional hardware functionality included in the SOC 1800. For example, the peripherals 1840A-1840B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 1860 external to the SOC 1800 (e.g. the peripheral 1840B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

More particularly in FIG. 18, SOC 1800 may include at least one instance of a video encoder 1700 component, for example a video encoder 1700 as illustrated in FIG. 17 that includes a block processing pipeline 1740 component that implements a block processing method 1000 as illustrated in FIG. 10. Video encoder 1700 may be an H.264 video encoder apparatus that may be configured to convert input video frames from an input format into H.264/Advanced Video Coding (AVC) format as described in the H.264/AVC standard. The block processing pipeline 1740 may implement one or more of the block processing methods and apparatus as described herein in relation to FIGS. 3 through 16.

The CPU complex 1820 may include one or more CPU processors 1824 that serve as the CPU of the SOC 1800. The CPU of the system includes the processor(s) that execute the main control software of the system, such as an operating system. Generally, software executed by the CPU during use may control the other components of the system to realize the desired functionality of the system. The processors 1824 may also execute other software, such as application programs. The application programs may provide user functionality, and may rely on the operating system for lower level device control. Accordingly, the processors 1824 may also be referred to as application processors. The CPU complex 1820 may further include other hardware such as the L2 cache 1822 and/or and interface to the other components of the system (e.g. an interface to the communication fabric 1810). Generally, a processor may include any circuitry and/or microcode configured to execute instructions defined in an instruction set architecture implemented by the processor. The instructions and data operated on by the processors in response to executing the instructions may generally be stored in the memory 1850, although certain instructions may be defined for direct processor access to peripherals as well. In some embodiments, the data stored in memory 1850 may include aggregate and/or individual skip threshold values to be applied in various computations of a skip mode decision process. Processors may encompass processor cores implemented on an integrated circuit with other components as a system on a chip (SOC 1800) or other levels of integration. Processors may further encompass discrete microprocessors, processor cores and/or microprocessors integrated into multichip module implementations, processors implemented as multiple integrated circuits, etc.

The memory controller 1830 may generally include the circuitry for receiving memory operations from the other components of the SOC 1800 and for accessing the memory 1850 to complete the memory operations. The memory controller 1830 may be configured to access any type of memory 1850. For example, the memory 1850 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 1830 may include queues for memory operations, for ordering (and potentially reordering) the operations and presenting the operations to the memory 1850. The memory controller 1830 may further include data buffers to store write data awaiting write to memory and read data awaiting return to the source of the memory operation. In some embodiments, the memory controller 1830 may include a memory cache to store recently accessed memory data. In SOC implementations, for example, the memory cache may reduce power consumption in the SOC by avoiding reaccess of data from the memory 1850 if it is expected to be accessed again soon. In some cases, the memory cache may also be referred to as a system cache, as opposed to private caches such as the L2 cache 1822 or caches in the processors 1824, which serve only certain components. Additionally, in some embodiments, a system cache need not be located within the memory controller 1830.

In an embodiment, the memory 1850 may be packaged with the SOC 1800 in a chip-on-chip or package-on-package configuration. A multichip module configuration of the SOC 1800 and the memory 1850 may be used as well. Such configurations may be relatively more secure (in terms of data observability) than transmissions to other components in the system (e.g. to the end points 16A-16B). Accordingly, protected data may reside in the memory 1850 unencrypted, whereas the protected data may be encrypted for exchange between the SOC 1800 and external endpoints.

The communication fabric 1810 may be any communication interconnect and protocol for communicating among the components of the SOC 1800. The communication fabric 1810 may be bus-based, including shared bus configurations, cross bar configurations, and hierarchical buses with bridges. The communication fabric 1810 may also be packet-based, and may be hierarchical with bridges, cross bar, point-to-point, or other interconnects.

It is noted that the number of components of the SOC 1800 (and the number of subcomponents for those shown in FIG. 18, such as within the CPU complex 1820) may vary from embodiment to embodiment. There may be more or fewer of each component/subcomponent than the number shown in FIG. 18.

Example System

Figure 19:
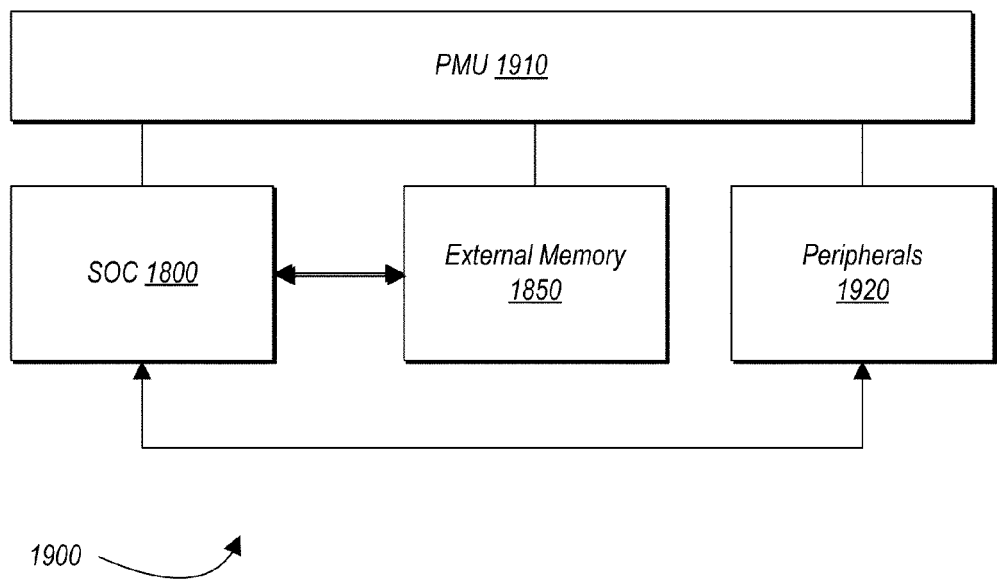
FIG. 19 is a block diagram illustrating one embodiment of a system that includes at least one instance of an SOC.

FIG. 19 a block diagram of one embodiment of a system 1900. In the illustrated embodiment, the system 1900 includes at least one instance of the SOC 1800 coupled to one or more external peripherals 1920 and the external memory 1850. A power management unit (PMU) 1910 is provided which supplies the supply voltages to the SOC 1800 as well as one or more supply voltages to the memory 1850 and/or the peripherals 1920. In some embodiments, more than one instance of the SOC 1800 may be included (and more than one memory 1850 may be included as well).

The peripherals 1920 may include any desired circuitry, depending on the type of system 1900. For example, in one embodiment, the system 1900 may be a mobile device (e.g. personal digital assistant (PDA), smart phone, etc.) and the peripherals 1920 may include devices for various types of wireless communication, such as wifi, Bluetooth, cellular, global positioning system, etc. The peripherals 1920 may also include additional storage, including RAM storage, solid state storage, or disk storage. The peripherals 1920 may include user interface devices such as a display screen, including touch display screens or multitouch display screens, keyboard or other input devices, microphones, speakers, etc. In other embodiments, the system 1900 may be any type of computing system (e.g. desktop personal computer, laptop, workstation, net top etc.).

The external memory 1850 may include any type of memory. For example, the external memory 1850 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 1850 may include one or more memory modules to which the memory devices are mounted, such as single inline memory modules (SIMMs), dual inline memory modules (DIMMs), etc. Alternatively, the external memory 1850 may include one or more memory devices that are mounted on the SOC 1800 in a chip-on-chip or package-on-package implementation.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
a block processing pipeline that implements a plurality of stages each comprising at least one component, each component configured to perform one or more operations on a macroblock of pixels from a video frame passing through the pipeline;
wherein one or more components of the block processing pipeline are collectively configured to:
generate an initial determination that a macroblock of pixels should be designated as a skip macroblock, wherein designation of the macroblock as a skip macroblock indicates that the macroblock should be represented by a macroblock predictor rather than by an encoding of a motion vector difference and a residual for the macroblock, and wherein to generate the initial determination, the one or more components are configured to compute one or more aggregate metrics for a representation of a luma component of the macroblock;
subsequent to generation of the initial determination, determine that the macroblock should not be designated as a skip macroblock; and
subsequent to the determination that the macroblock should not be designated as a skip macroblock, provide a motion vector difference and a residual for the macroblock to one or more other components of the block processing pipeline.

2. The apparatus of claim 1, wherein to generate the initial determination, the one or more components are configured to compute a sum of absolute differences, a sum of absolute transformed differences, or a sum of squared differences between pixels of the macroblock predictor and corresponding pixels of the macroblock.

3. The apparatus of claim 2, wherein to determine that the macroblock should not be designated as a skip macroblock, the one or more components are further configured to determine that a maximum difference between any individual pixel of the macroblock predictor and a corresponding pixel of the macroblock exceeds a pre-determined threshold or that a difference between an individual pixel of the macroblock predictor and a corresponding pixel of the macroblock exceeds a pre-determined threshold for at least a pre-defined number of pixels of the macroblock.

4. The apparatus of claim 2, wherein to determine that the macroblock should not be designated as a skip macroblock, the one or more components are further configured to determine that a maximum difference between any individual pixel of the macroblock predictor and a corresponding pixel of the macroblock in a designated region of interest in the macroblock exceeds a pre-determined threshold or that a difference between an individual pixel of the macroblock predictor and a corresponding pixel of the macroblock exceeds a pre-determined threshold for at least a pre-defined number of pixels in a designated region of interest in the macroblock.

5. The apparatus of claim 4, wherein the designated region of interest comprises a cluster of pixels that was detected as representing a face or an object of interest.

6. The apparatus of claim 1, wherein the determination that the macroblock should not be designated as a skip macroblock is performed in a stage of the block processing pipeline that succeeds a stage of the block processing pipeline in which generation of the initial determination was performed.

7. The apparatus of claim 6, wherein the stage of the block processing pipeline in which the determination that the macroblock should not be designated as a skip macroblock is performed operates on a representation of a chroma component of the macroblock.

8. A method of performing video encoding, comprising:
performing by a computer:
generating an initial determination that a macroblock of pixels comprising at least a portion of video frame should be designated as a skip macroblock, wherein designating the macroblock as a skip macroblock indicates that the macroblock should be represented in one or more subsequent video encoding stages by a macroblock predictor rather than by an encoding of a motion vector difference and a residual for the macroblock;
subsequent to said generating, determining that the initial determination should be reversed; and
subsequent to said determining, coding a motion vector difference and a residual for the macroblock.

9. The method of claim 8, wherein said generating is dependent on metric for the macroblock that is computed based on an aggregation of differences between the macroblock and the macroblock predictor for multiple pixels of the luma component of the macroblock.

10. The method of claim 8, wherein said determining is dependent on the difference between the macroblock and the macroblock predictor for a single pixel of the luma component of the macroblock.

11. The method of claim 8, wherein said determining is dependent on one or more metrics that are computed for a chroma component of the macroblock.

12. The method of claim 8, wherein said determining is performed at an entropy encoding stage of a video encoding process.

13. The method of claim 12, wherein said determining comprises determining that the macroblock is the last macroblock in a row of macroblocks in the video frame.

14. The method of claim 8, further comprising:
prior to said determining, passing information usable in coding the motion vector difference and the residual to a stage of the video encoding process that succeeds a stage of the video encoding process in which said generating was performed.

15. The method of claim 8,
wherein said generating is performed at a stage of a video encoding process that comprises a low-resolution motion search and a higher-resolution motion search; and
wherein in response to said generating, the method comprises eliding the higher-resolution motion search.

16. A device, comprising:
a memory; and
an apparatus configured to process video frames and to store the processed video frames as frame data to the memory;
wherein the apparatus is configured to:
compute a sum of absolute differences, a sum of absolute transformed differences, or a sum of squared differences between pixels of a macroblock that comprises at least a portion of a video frame and corresponding pixels of a macroblock predictor;
determine whether the sum exceeds a pre-determined threshold for the sum;
compute a maximum difference between each of one or more individual pixels of the macroblock and a corresponding pixel of the macroblock predictor;
determine whether the maximum difference exceeds a pre-determined threshold for the maximum difference;
in response to determining that the sum does not exceed a pre-determined threshold for the sum and that the maximum difference does not exceed a pre-determined threshold for the maximum difference, generate an indication that the macroblock should be designated as a skip macroblock, wherein designation of the macroblock as a skip macroblock indicates that the macroblock should be represented by the macroblock predictor rather than by an encoding of a motion vector difference and a residual for the macroblock; and
in response to determining, subsequent to generating the indication, that the sum exceeds the pre-determined threshold for the sum and the maximum difference exceeds the pre-determined threshold for the maximum difference, determine that the designation should be reversed.

17. The device of claim 16, wherein to compute the sum, the apparatus is configured to operate on a representation of a luma component of the macroblock.

18. The device of claim 16, wherein to compute the maximum difference, the apparatus is configured to operate on a representation of a luma component of the macroblock.

19. The device of claim 16, wherein to compute the maximum difference, the apparatus is configured to operate on a representation of a chroma component of the macroblock.

20. The device of claim 16, wherein, subsequent to generating the indication that the macroblock should be designated as a skip macroblock, the apparatus is further configured to:
override the designation of a macroblock as a skip macroblock; and
encode a motion vector difference and a residual for the macroblock.

* * * * *